（12）United States Patent
Osakabe et al.

(10) Patent No.: US 8,867,112 B2
(45) Date of Patent: Oct. 21, 2014

(54) IMAGE READING DEVICE DETERMINING CONVEYING PATH

(71) Applicants: Yoshinori Osakabe, Seto (JP); Daisuke Matsumoto, Nagoya (JP)

(72) Inventors: Yoshinori Osakabe, Seto (JP); Daisuke Matsumoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/084,112

(22) Filed: Nov. 19, 2013

(65) Prior Publication Data

US 2014/0139896 A1    May 22, 2014

(30) Foreign Application Priority Data

Nov. 20, 2012   (JP) ................................ 2012-254757

(51) Int. Cl.
*H04N 1/04*       (2006.01)
*H04N 1/10*       (2006.01)

(52) U.S. Cl.
CPC ....................................... *H04N 1/10* (2013.01)
USPC ........... 358/498; 358/474; 358/497; 358/496; 399/367

(58) Field of Classification Search
CPC ................. H04N 2201/0094; H04N 1/00602; H04N 2201/04739; H04N 2201/04756; H04N 1/00591; H04N 1/00729; H04N 1/00745; H04N 1/00774; H04N 1/121; H04N 2201/044
USPC .......... 358/474, 498, 496, 497, 1.9, 296, 448, 358/504, 406, 449; 399/358, 379, 380, 388, 399/391, 407; 271/221, 227, 228, 252, 271/258.03, 265.02, 266, 270, 275, 279, 271/301, 306, 3.18, 9.01, 9.03, 9.04, 9.05, 271/9.08, 9.1
See application file for complete search history.

(56) References Cited

U.S. PATENT DOCUMENTS

| | | | | |
|---|---|---|---|---|
| 4,797,706 A | * | 1/1989 | Sugishima et al. | ........... 358/300 |
| 5,988,817 A | | 11/1999 | Mizushima et al. | |
| 6,585,258 B1 | * | 7/2003 | Hirota et al. | ................. 271/186 |
| 6,646,768 B1 | * | 11/2003 | Andersen et al. | ............. 358/474 |

(Continued)

FOREIGN PATENT DOCUMENTS

| | | |
|---|---|---|
| JP | H04-256662 A | 9/1992 |
| JP | H11-127301 A | 5/1999 |

(Continued)

OTHER PUBLICATIONS

Notice of Allowance issued in corresponding U.S. Appl. No. 13/417,356, mailed Aug. 13, 2013.

*Primary Examiner* — Negussie Worku
(74) *Attorney, Agent, or Firm* — Banner & Witcoff, Ltd.

(57) ABSTRACT

In an image reading device, a scanning unit moves relative to the main unit between a base position and a moved position. A conveyance unit moves relative to the scanning unit between a base position and a moved position at which the cover closes the platen, and is formed with a first and second openings. The cover member moves between a base position at which the cover member covers a second opening and a moved position. The first and second detectors detect a state of the scanning unit, the conveyance unit, and the cover member. The conveyance unit conveys the document along one of a first and second conveying paths that is used to convey the document and is determined based on the state of the first and second detectors.

11 Claims, 22 Drawing Sheets

(56) References Cited

U.S. PATENT DOCUMENTS

| | | | |
|---|---|---|---|
| 6,674,991 B2 * | 1/2004 | Makino et al. | 399/374 |
| 7,342,693 B2 | 3/2008 | Morisaki | |
| 7,446,908 B2 | 11/2008 | Araki et al. | |
| 7,577,392 B2 * | 8/2009 | Magata et al. | 399/367 |
| 7,626,735 B2 * | 12/2009 | Mizuhashi et al. | 358/474 |
| 7,668,499 B2 * | 2/2010 | Kim | 399/367 |
| 7,672,636 B2 * | 3/2010 | Ono | 399/380 |
| 7,911,658 B2 | 3/2011 | Yamamoto | |
| 7,957,034 B2 | 6/2011 | Ueda et al. | |
| 8,035,864 B2 | 10/2011 | Nakai et al. | |
| 8,199,373 B2 | 6/2012 | Ito | |
| 8,274,711 B2 | 9/2012 | Hiro | |
| 8,305,684 B2 | 11/2012 | Mizuta | |
| 8,358,449 B2 | 1/2013 | Seo | |
| 8,427,718 B2 | 4/2013 | Omoya | |
| 8,462,393 B2 | 6/2013 | Kohara et al. | |
| 8,605,342 B2 * | 12/2013 | Akimatsu | 358/498 |
| 8,619,342 B2 * | 12/2013 | Higashitani | 358/474 |
| 8,619,346 B2 * | 12/2013 | Takeuchi | 358/498 |
| 8,675,263 B2 * | 3/2014 | Takeuchi et al. | 358/474 |
| 2004/0184120 A1 | 9/2004 | Araki et al. | |
| 2013/0083372 A1 | 4/2013 | Osakabe | |
| 2014/0211277 A1 | 7/2014 | Ozaki | |

FOREIGN PATENT DOCUMENTS

| | | |
|---|---|---|
| JP | 2001-197232 A | 7/2001 |
| JP | 2004-154975 A | 6/2004 |
| JP | 2004-282438 A | 10/2004 |
| JP | 2006-084569 A | 3/2006 |
| JP | 2007-049300 A | 2/2007 |
| JP | 2010-282077 A | 12/2010 |
| JP | 2013-077259 A | 4/2013 |

* cited by examiner

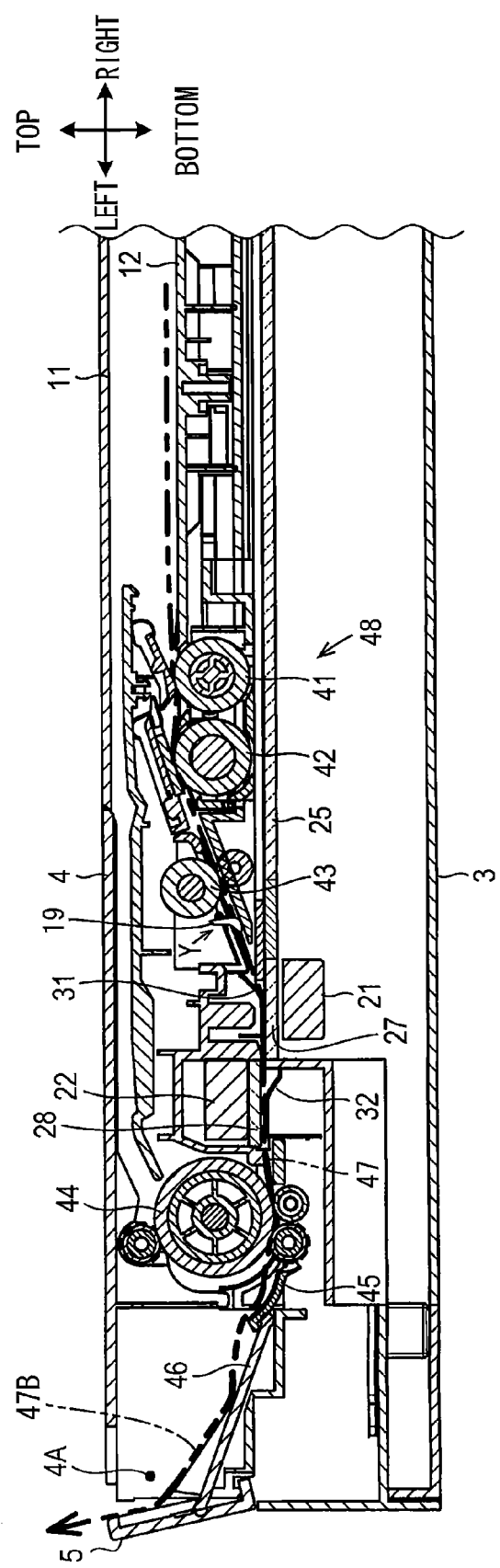

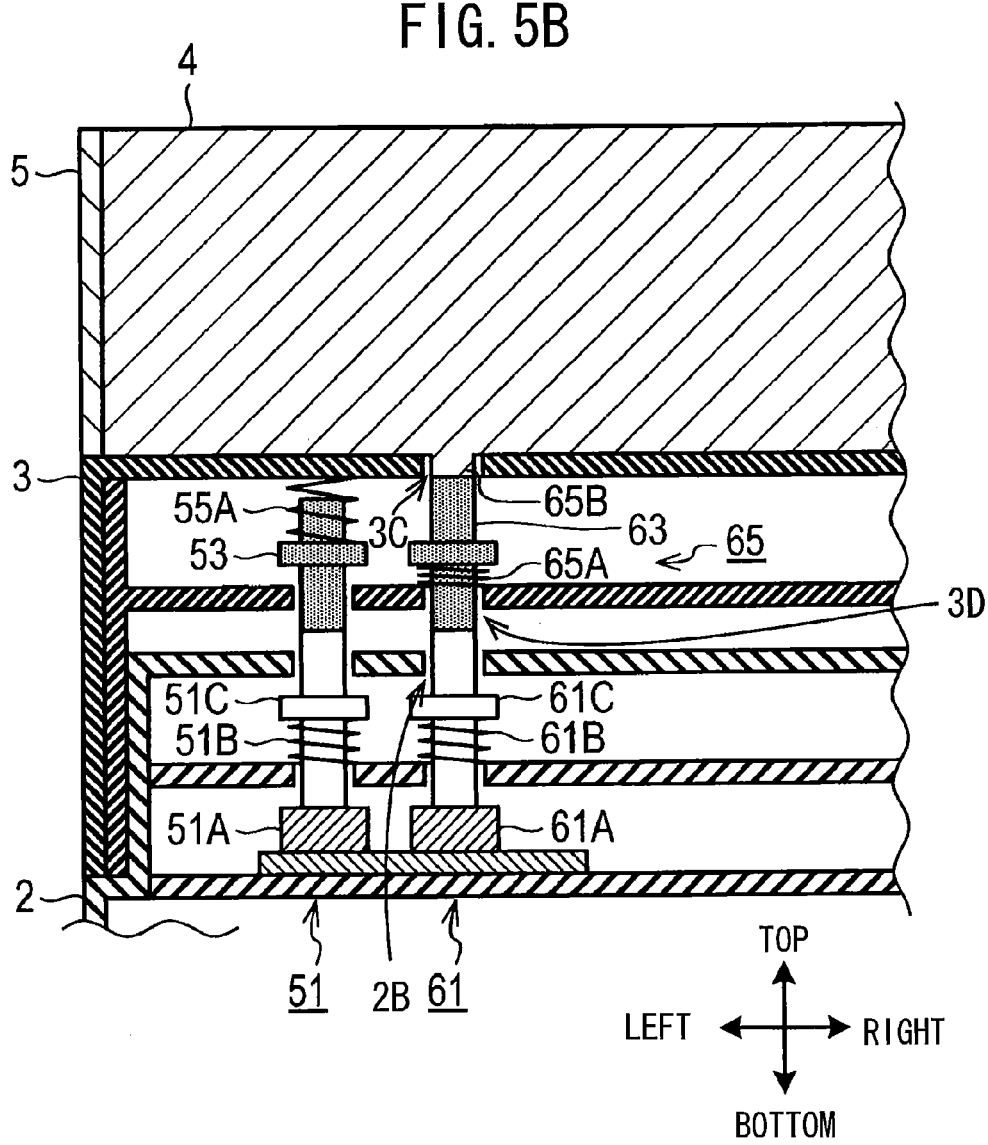

FIG. 9

| | SCANNING UNIT | CONVYANCE UNIT | COVER MEMBER | FIRST SWITCH | SECOND SWITCH |
|---|---|---|---|---|---|
| STATE A | CLOSE | CLOSE | CLOSE | ON | ON |
| STATE B | CLOSE | CLOSE | OPEN | OFF | ON |
| STATE C | CLOSE / CLOSE | OPEN / OPEN | OPEN / CLOSE | ON | OFF |
| STATE D | OPEN / OPEN | OPEN / OPEN | CLOSE / OPEN | OFF | OFF |

IMAGE READING DEVICE DETERMINING CONVEYING PATH

CROSS REFERENCE TO RELATED APPLICATION

This application claims priority from Japanese Patent Application No. 2012-254757 filed Nov. 20, 2012. The entire content of the priority application is incorporated herein by reference.

TECHNICAL FIELD

The invention disclosed herein relates to an image reading device that conveys and reads a document.

BACKGROUND

Japanese Patent Application Publication No. H11-127301 discloses an image reading device conveying and reading a document. In the image reading device, as a document to be conveyed becomes thicker, the document tends to be bent, or the device is jammed. Accordingly, conventionally, a technique has been used to detect the thickness of the document to be conveyed, and switch conveying paths depending on the detected thickness of the document.

SUMMARY

It is conceivable that an image reading device conveying and reading a document might switch conveying paths depending on an opening-and-closing state of a plurality of opening-and-closing sections such as a cover provided adjacent a conveying path, not depending on the thickness of the document. It is further conceivable that, in such an image reading device, a conveying path is determined based on the opening-and-closing state of some of the opening-and-closing sections. However, if the other opening-and-closing sections, such as a portion containing a reading section that reads the document, are separate from a main body in an opening state, the problem arises that the image reading device is jammed as the document is not properly conveyed or that the document cannot be appropriately read. Therefore, the image reading device that switches conveying paths depending on the opening-and-closing state of a plurality of opening-and-closing sections needs to determine not only a conveying path but also whether or not the document can be conveyed, depending on the opening-and-closing state of the opening-and-closing sections.

In this case, detection sections may be disposed to detect the opening-and-closing state of a plurality of opening-and-closing sections. Based on a detection state of the detection sections, the image reading device can determine a conveying path and whether or not the document can be conveyed. However, if the detection sections are disposed in a plurality of opening-and-closing sections, the detection sections increase in number, making the cost of the device higher, or making control complicated due to an increase in the number of detection states output from the detection sections.

The present invention provides a technique with respect to an image reading device conveying and reading the document for determining a conveying path and whether or not a document can be conveyed by using fewer detection sections than opening-and-closing sections.

In order to attain the above and other objects, the invention provides an image reading device. The image reading device includes a main unit, a scanning unit, a conveyance unit, a first detector, and a second detector. The scanning unit is located above the main unit and is configured to move relative to the main unit between a first base position and a first moved position. An original sheet is configured to be scanned by the scanning unit. The conveyance unit is located above the scanning unit and includes a tray and a cover member, and is formed with a first opening and a second opening. The conveyance unit is configured to convey the original sheet along one of a first conveying path and a second conveying path. The first conveying path extends from the tray to the first opening, and the second conveying path extends from the tray to the second opening. The conveyance unit is configured to move relative to the scanning unit between a second base position and a second moved position. The cover member is configured to move between a third base position at which the cover member covers the second opening and a third moved position at which the cover member does not cover the second opening. The first detector is configured to detect a first state and a second state. The first state includes one of a case (a) where the scanning unit is at the first base position, the conveyance unit is at the second base position, and the cover member is at the third base position, and a case (b) where the scanning unit is at the first base position and the conveyance unit is at the second moved position, and the second state including one of a case (c) where the scanning unit is at the first base position, the conveyance unit is at the second base position, and the cover member is at the third moved position, and a case (d) where the scanning unit is at the first moved position. The second detector is configured to detect a third state in which the scanning unit is at the first base position, and the conveyance unit is at the second base position, and a fourth state including one of a case (e) where the scanning unit is at the first moved position, and a case (f) where the conveyance unit is at the second moved position. The conveyance unit is configured to convey the original sheet along the first conveying path when the first detector detects the first state and the second detector detects the third state, and to convey the original sheet along the second conveying path when the first detector detects the second state and the second detector detects the third state.

BRIEF DESCRIPTION OF THE DRAWINGS

The particular features and advantages of the invention as well as other objects will become apparent from the following description taken in connection with the accompanying drawings, in which:

FIG. 4B is a cross-sectional view of the multifunction peripheral in the state B;

FIG. 5B is a cross-sectional view of the first detection section and a second detection section when the multifunction peripheral is in the state A;

FIG. 9 is a table showing a relation between the states A-D and an opening-and-closing state of a reading unit, a conveyance unit, and a cover member;

DETAILED DESCRIPTION

1. Mechanical Configuration of Multifunction Peripheral

Figure 1A:
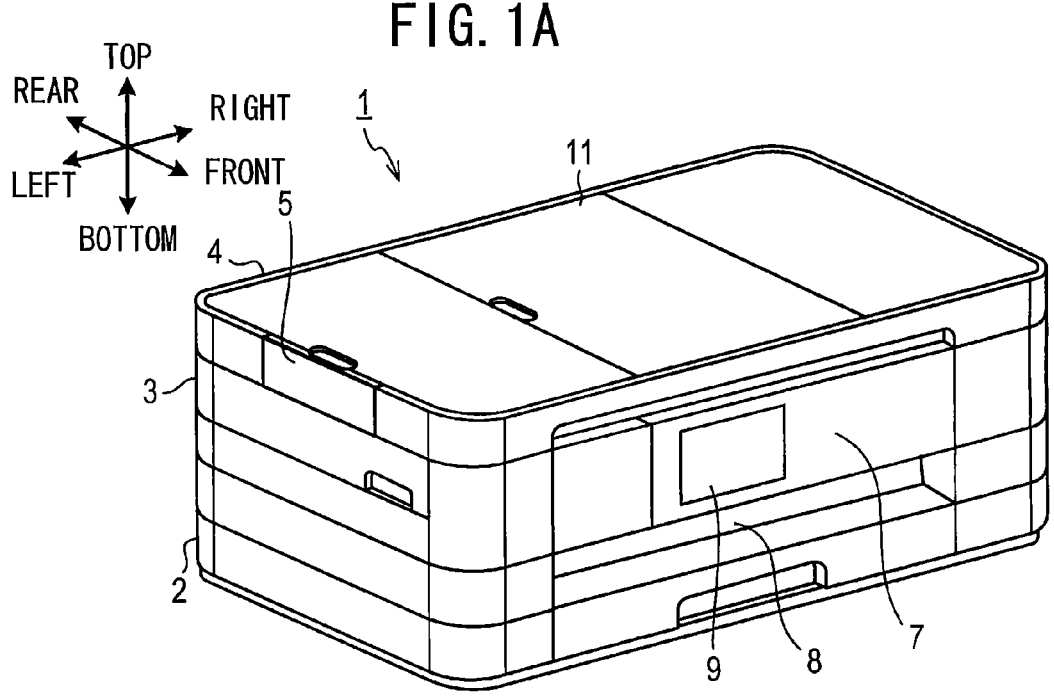
FIG. 1A is a perspective view of a multifunction peripheral in a state A according to a first embodiment.
Figure 1B:
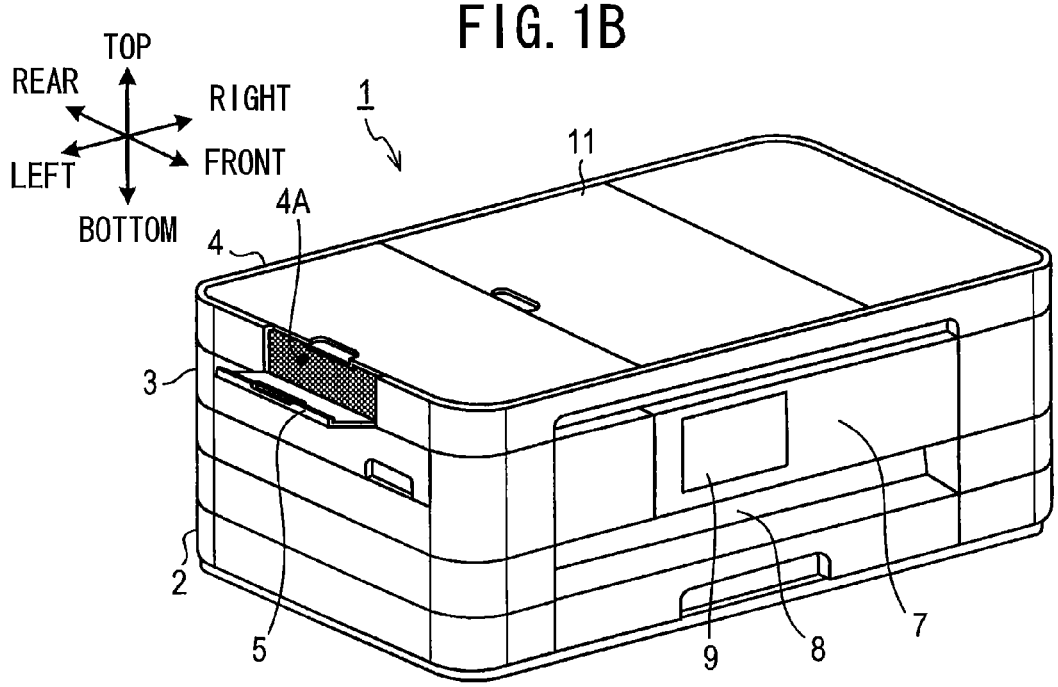
FIG. 1B is a perspective view of the multifunction peripheral in a state B.

A first embodiment will be described with reference to FIGS. 1A to 16. FIG. 1A is a perspective view of a multifunction peripheral 1. The multifunction peripheral 1 includes a printer function, a scanner function, a copy function, and a facsimile function. The terms "upward", "downward", "upper", "lower", "above", "below", "beneath", "right", "left", "front", "rear" and the like will be used throughout the description assuming that the multifunction peripheral is disposed in an orientation in which it is intended to be used. In use, the multifunction peripheral 1 is disposed as shown in FIG. 1A.

As shown in FIG. 1A, the multifunction peripheral 1 includes, from bottom to top, a main body unit 2, a scanning unit 3, and a conveyance unit 4 stacked in this order. The main body unit 2 includes, as a main unit, a casing in which an image forming section 8 and a CPU 70 (See FIG. 10) are accommodated.

Figure 2A:
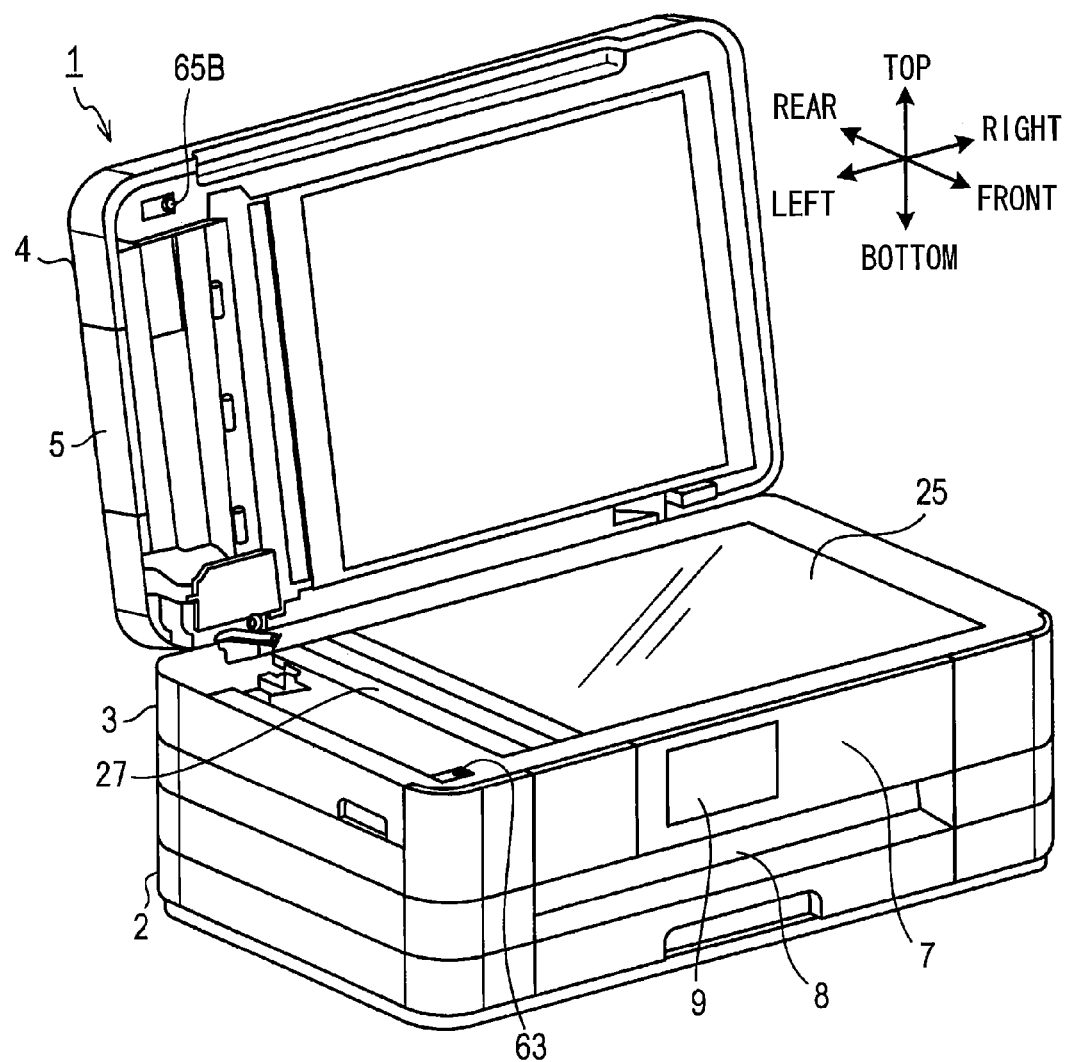
FIG. 2A is a perspective view of the multifunction peripheral in a state C.
Figure 2B:
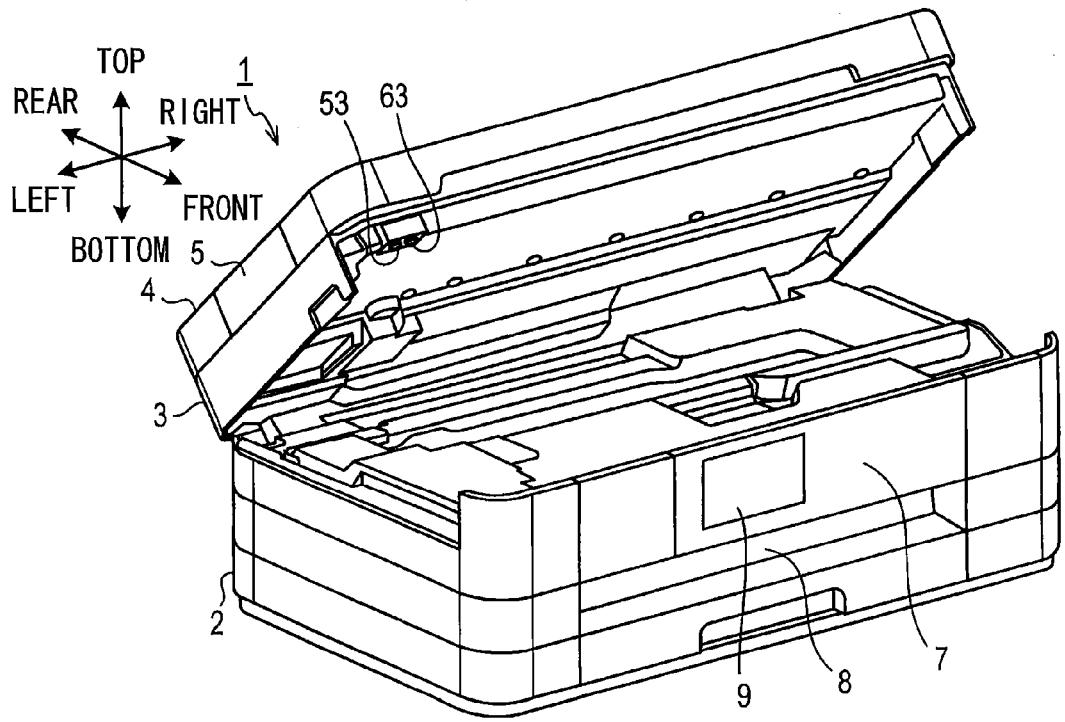
FIG. 2B is a perspective view of the multifunction peripheral in a state D.

The scanning unit 3 covers an entire upper surface of the main body unit 2. The scanning unit 3 can rotate relative to the main body unit 2 about an axis line at a rear end of the main body unit 2. As the scanning unit 3 is rotated, the scanning unit 3 moves between a closing position (See FIG. 1A) where the scanning unit 3 covers the main body unit 2, and an opening position (See FIG. 2B) where the scanning unit 3 does not cover the inside of the main body unit 2. The scanning unit 3 includes a first reading unit 21 (See FIG. 4A). As shown in FIG. 2A, the scanning unit 3 includes a first platen glass 25 and a second platen glass 27 on an upper surface thereof. The first platen glass 25 and the second platen glass 27 are made from a transparent glass plate.

The conveyance unit 4 covers an entire upper surface of the scanning unit 3. The conveyance unit 4 can rotate relative to scanning unit 3 about an axis line at a rear end of the scanning unit 3. As the conveyance unit 4 is rotated, the conveyance unit 4 moves between a closing position (See FIG. 1A) where the conveyance unit 4 covers the scanning unit 3, and an opening position (See FIG. 2A) where the document conveyance unit does not cover the scanning unit 3. That is, the first platen glass 25 is covered with the conveyance unit 4 which can move the opening position in which the conveyance unit 4 does not cover the platen glass 25.

Figure 3A:
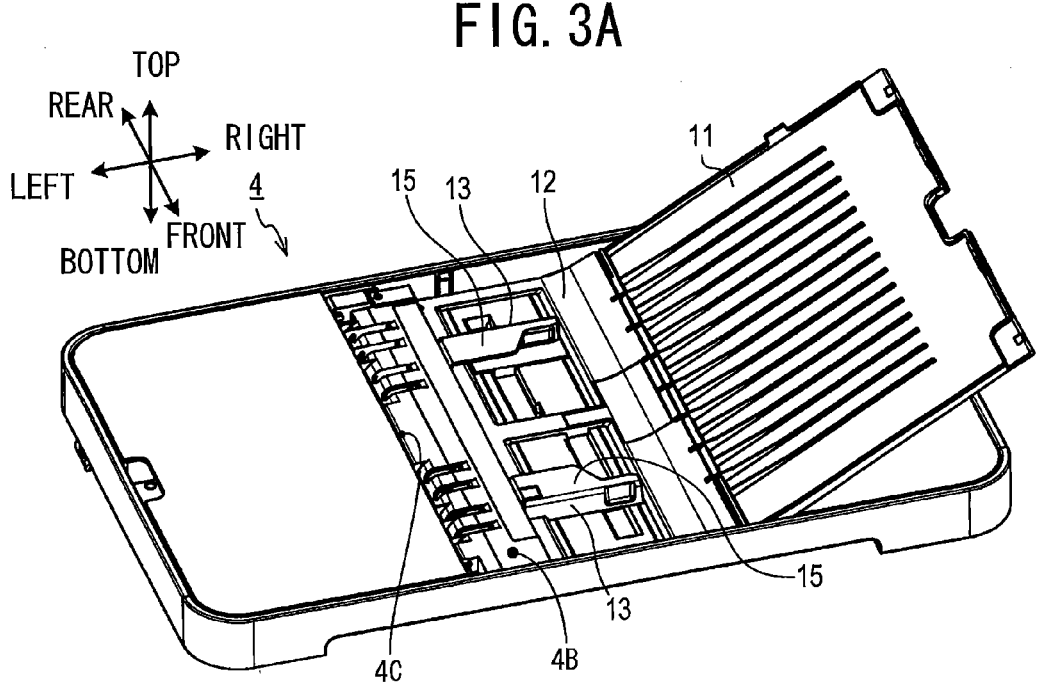
FIG. 3A is a perspective view of the conveying unit when an upper cover is at an opening position.
Figure 4A:
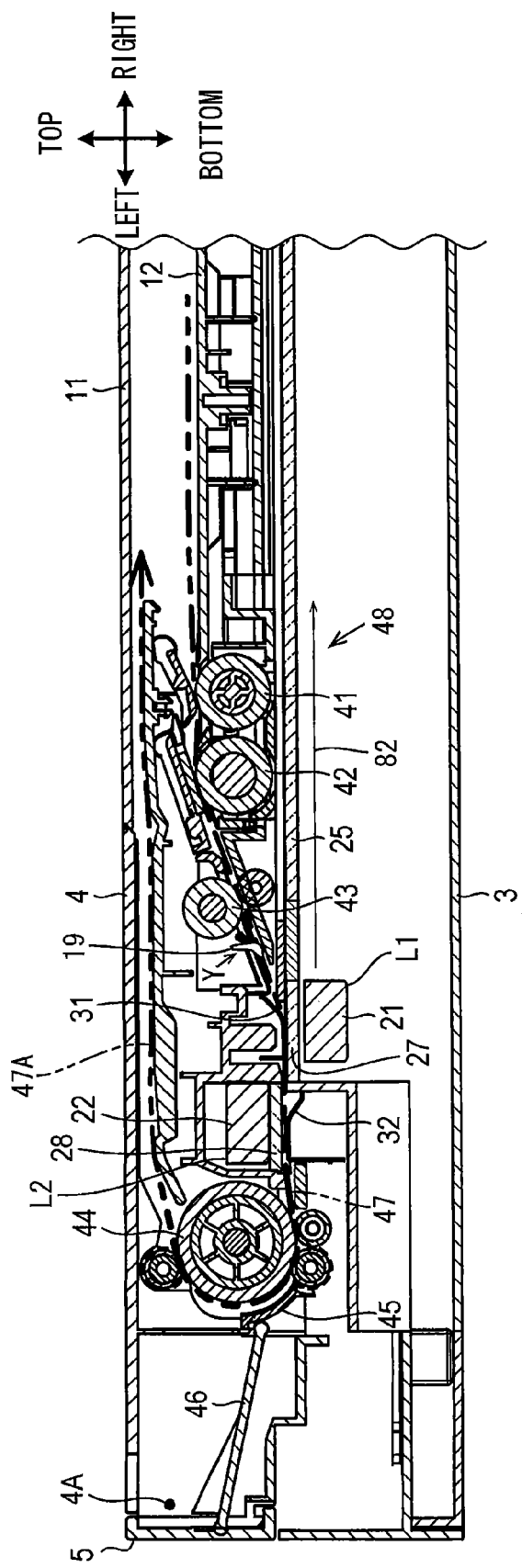
FIG. 4A is a cross-sectional view of the multifunction peripheral in the state A.
Figure 10:
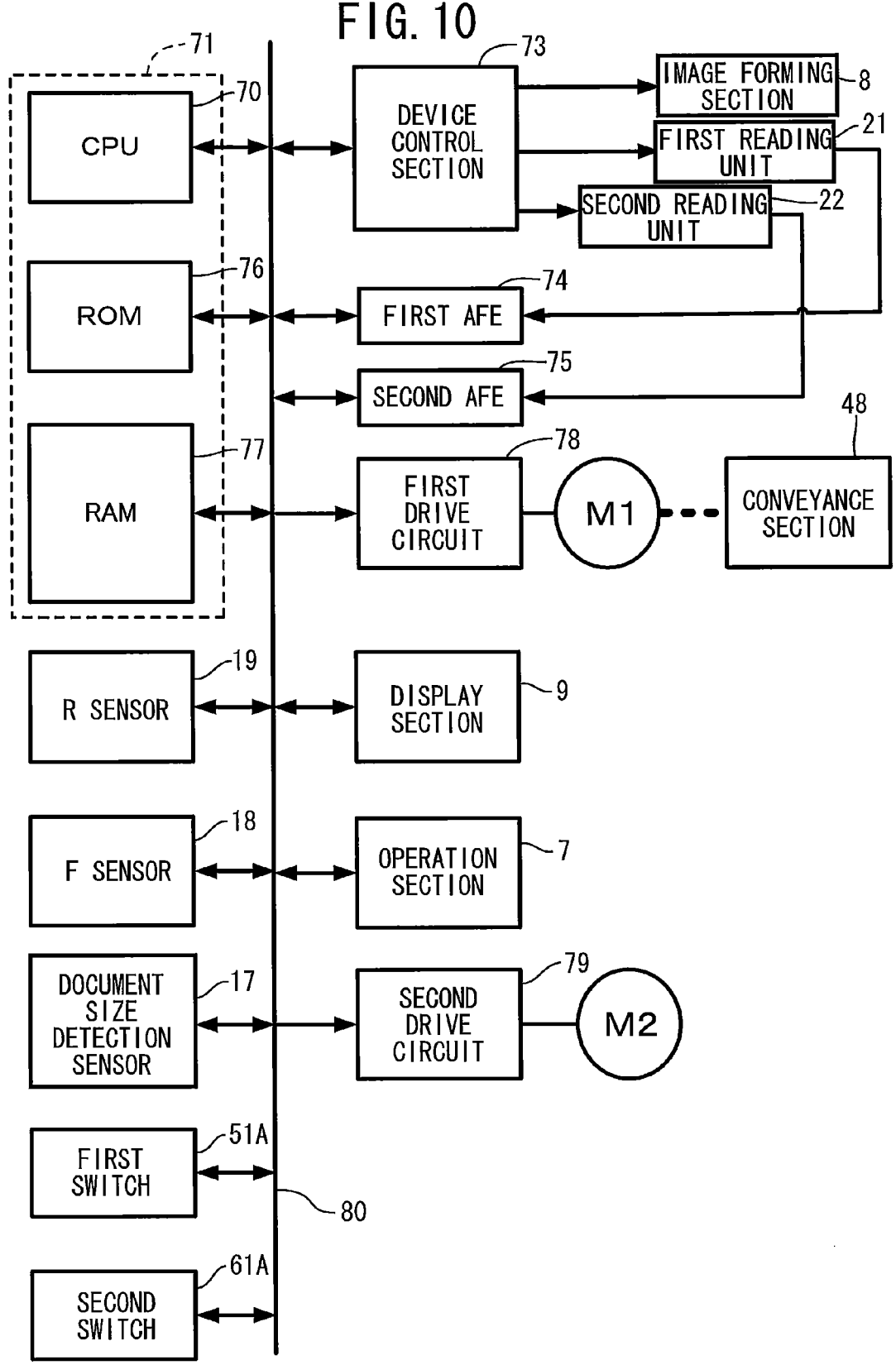
FIG. 10 is a schematic view illustrating an electrical structure of the multifunction peripheral.

The conveyance unit 4 includes a conveyance section 48 that conveys a document (original sheet) along a conveying path 47 (See FIG. 10). A cover member 5; and an upper cover 11 are provided at the conveying unit 4. As shown in FIGS. 3A and 4A, the conveyance unit 4 is formed with an opening sections 4A and 4C. According to the embodiment, a sheet-like document is referred to simply as "document". The cover member 5 is provided at a left end of the conveyance unit 4. The cover member 5 can rotate relative to the conveyance unit 4 about an axis line provided at the left end of the conveyance unit 4. As the cover member 5 is rotated, the cover member 5 moves between a closing position (See FIG. 1A) where the cover member 5 covers a part of the conveyance unit 4, and an opening position (See FIG. 1B) where the cover member 5 does not cover the part of the conveyance unit 4.

As the cover member 5 is moved to the opening position, the opening section 4A of the conveyance unit 4 is opened. As the cover member 5 is moved to the closing position, the opening section 4A is closed. In the multifunction peripheral 1 of the embodiment, a width of the opening section 4A in a front-back-direction is so set as to be substantially equal to a document width of a postcard.

The upper cover 11 is provided on an upper surface of the conveyance unit 4. The upper cover 11 can rotate relative to the conveyance unit 4 about an axis line provided at the upper surface of the conveyance unit 4. As the upper cover 11 is rotated, the upper cover 11 moves between a closing position (See FIG. 1A) where the upper cover 11 covers the conveyance unit 4, and an opening position (See FIG. 3A) where the upper cover 11 opens the conveyance unit 4.

As the upper cover 11 is moved to the opening position, an opening section 4B of the conveyance unit 4 is opened. When the upper cover 11 is at the closing position, a back surface of the upper cover 11 faces downward. When the upper cover is at the opening position, the back surface of the upper cover 11 constitutes a document table 12 on which a document is placed.

As shown in FIG. 3A, document guides 13 are provided in the opening section 4B of the conveyance unit 4. The document guides 13 can slide in the front-back direction. A document placed on the document table 12 is placed at a central reference point of a conveying path 47 in the front-back direction with the help of the document guides 13.

Partition plates 15 are provided on the document guides 13. A document placed on the document table 12 is placed below the partition plates 15. As described later, some of documents conveyed along the conveying path 47 pass through the opening section 4C (FIG. 3A), and are discharged above the partition plates 15.

Figure 3B:
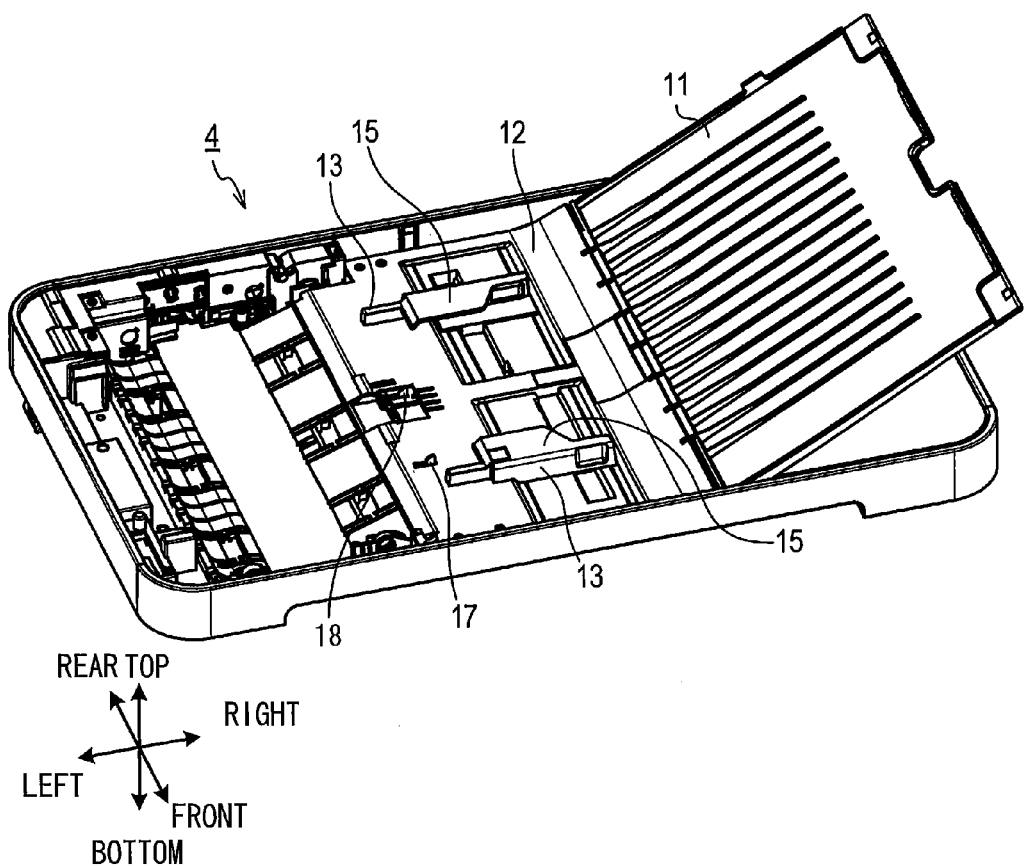
FIG. 3B is a perspective view of the conveying unit illustrating an inner structure of the conveying unit.

As shown in FIG. 3B, inside of the opening section 4B of the conveyance unit 4, a front sensor (referred to as F sensor, hereinafter) 18 and a document size detection sensor 17 are provided. The F sensor 18 is disposed at the center of the conveying path 47 in the front-back direction, and detects whether or not a document is placed on the document table 12. The document size detection sensor 17 is disposed at a position shifted from the center of the conveying path 47 to a front direction by a reference distance. When a document placed on the document table 12 is a large document, the document size detection sensor 17 is turned ON. When the document is a small document, the document size detection sensor 17 is turned OFF. In the multifunction peripheral 1 of the embodiment, the reference distance is set to be substantially equal to half the document width of a postcard. That is, postcards and business cards are classified as small documents, and A4-size documents as large documents. In other words, the document size detection sensor 17 detects whether or not the document width of a document placed on the document table 12 is greater than the width of the opening section 4A.

FIG. 4A is a cross-sectional view of the scanning unit 3 and conveyance unit 4. As shown in FIG. 4A, the conveyance unit 4 further includes a second reading unit 22; a third platen glass 28 that is made from a transparent glass plate; a pressing member 31; a rear sensor (referred to as R sensor, hereinafter) 19; and an installation roller 41, a supply roller 42, a first conveyance roller 43, a second conveyance roller 44, and other rollers.

The conveying path 47 is provided in the conveyance unit 4. A document is conveyed through the conveying path 47 from the document table 12 to the opening sections 4A and 4C by various rollers. The first reading unit 21 and the second reading unit 22 are provided adjacent to the conveying path 47.

The first reading unit 21 is disposed in the scanning unit 3, and extends in a main-scanning direction, i.e. in the front-back direction. As indicated by arrow 82 in FIG. 4A, the first reading unit 21 is supported as to be so able to move below the first platen glass 25 in a sub-scanning direction, i.e. in a left-right direction by a motor M2 (See FIG. 10). Here, the sub-scanning direction is perpendicular to the main-scanning direction. The first reading unit 21 reads, while moving in the sub-scanning direction, a document that is placed at rest on the first platen glass 25.

The first reading unit 21 stops at a reading position L1 below the second platen glass 27 to read a document when the document conveyed along the conveying path 47 passes over the second platen glass 27.

The pressing member 31 is disposed facing the second platen glass 27. The pressing member 31 presses a document toward the second platen glass 27 in order to prevent the document passing over the second platen glass 27 from bending upward from the second platen glass 27. Incidentally, the following provides a description of the state and operation of the first reading unit 21 stopping at the reading position L, unless otherwise stated.

The second reading unit 22 is supported fixedly at a reading position L2 positioned inside the conveyance unit 4. The second reading unit 22 reads a document when the document conveyed along the conveying path 47 passes over the third platen glass 28. A pressing member 32 is disposed facing the third platen glass 28 in the scanning unit 3. The pressing member 32 presses an original sheet toward the third platen glass 28 in order to prevent the original sheet passing over the third platen glass 28 from bending away from the third platen glass 28.

The R sensor 19 is disposed at a detection position Y that is closer to an upstream side in the conveying direction than the reading positions L1 and L2 on the conveying path 47. The R sensor 19 is turned ON when a document goes through the detection position Y on the conveying path 47, and is turned OFF when no document goes through the detection position Y. That is, the R sensor 19 detects a document passing through the detection position Y on the conveying path 47.

Rollers such as the installation roller 41, the supply roller 42, the first conveyance roller 43, and the second conveyance roller 44 convey a document placed on the document table 12 to the opening sections 4A and 4C along the conveying path 47. That is, the rollers constitute the conveyance section 48 that conveys a document placed on the document table 12 to the opening sections 4A and 4C along the conveying path 47.

A switching plate 45 is disposed at a position opposite the second conveyance roller 44 with respect to the conveying path 47. In other words, the conveying path 47 passes through between the switching plate 45 and the second conveyance roller 44. The switching plate 45 rotates about an axis line provided at a lower end thereof, relative to the conveyance unit 4. As the switching plate 45 is rotated, the switching plate 45 moves between a closing position (See FIG. 4A) where the switching plate 45 is positioned near the second conveyance roller 44, and an opening position (See FIG. 4B) where the switching plate 45 is separate from the second conveyance roller 44.

More specifically, the switching plate 45 moves (rotates) as the cover member 5 is moved. A link member 46 is inserted between the cover member 5 and the switching plate 45. When the cover member 5 is at the closing position, the link member 46 presses an upper end of the switching plate 45 toward the second conveyance roller 44, thereby moving the switching plate 45 to the closing position. When the cover member 5 is at the opening position, the link member 46 does not press the upper end of the switching plate 45, and the switching plate 45 is moved to the opening position due to the weight of the switching plate 45.

After the switching plate 45 is moved to the closing position, a document on the conveying path 47 is conveyed along the second conveyance roller 44, and is discharged to the opening section 4C. Hereinafter, part of the conveying path 47 that goes along the peripheral surface of the second conveyance roller 44 is referred to as a first conveying path 47A. That is, the document is conveyed from the document table 12 to the opening section 4C by being turned around by the second conveyance roller 44 through the first conveying path 47A. After the switching plate 45 is moved to the opening position, a document on the conveying path 47 is conveyed away from the second conveyance roller 44 without turning around by the second conveyance roller 44, and is discharged to the opening section 4A. Hereinafter, part of the conveying path 47 that goes away from the second conveyance roller 44 is referred to as a second conveying path 47B. The document is conveyed from the document table 12 to the opening section 4A through the conveying path 47B. That is, the conveyance unit 4 switches the conveying paths 47 depending on the position of the switching late 45.

Furthermore, the multifunction peripheral 1 includes an operation section 7 (See FIG. 1A) that has a power switch and various setting buttons and accepts operation instructions from a user; and a display section 9 (See FIG. 1A) that has a LED or a liquid crystal display and displays the state of the multifunction peripheral 1.

2. Opening-and-Closing State Detection Mechanism

Figure 5A:
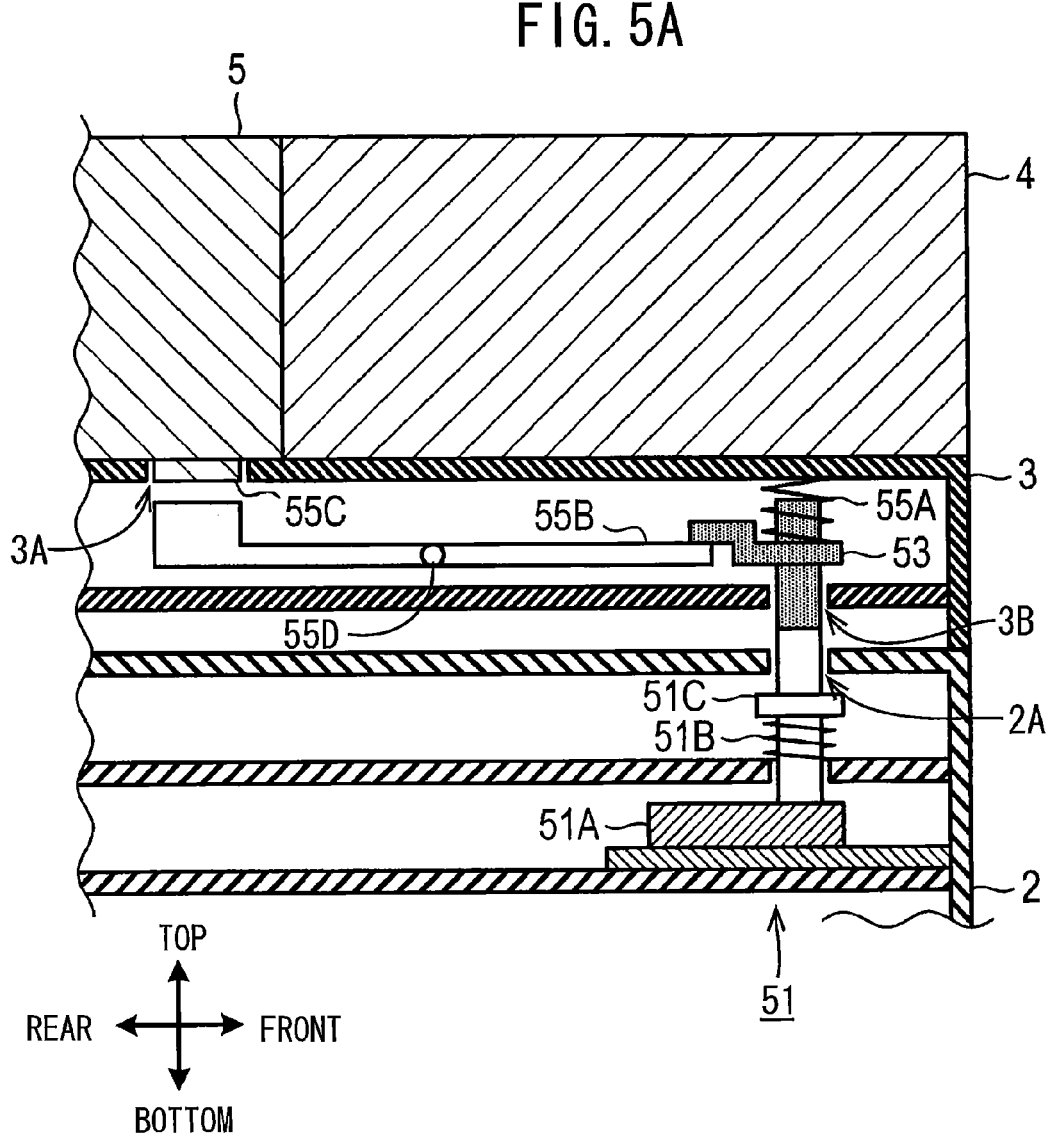
FIG. 5A is a cross-sectional view of a first detection section when the multifunction peripheral is in the state A.

The following describes an opening-and-closing state detection mechanism for the scanning unit 3, the conveyance unit 4, and the cover member 5. The opening-and-closing state detection mechanism includes a first detection section 51 and a second detection section 61, and is disposed near the left corner of a front section of the multifunction peripheral 1. The first detection section 51 includes an abutting section 55C, an operation transmission section 55B, a first movable member 53, an elevator member 51C, and a first switch 51A (FIG. 5A). The second detection section 61 includes a pressing section 65B, a second movable member 63, an elevator member 61C, and a second switch 61A (FIG. 5B).

The abutting section 55C and the pressing section 65B are provided in the conveyance unit 4. The operation transmission section 55B, the first movable member 53, and the second movable member 63 are provided in the scanning unit 3. The elevator member 51C, the first switch 51A, the elevator member 61C, and the second switch 61A are provided in the main body unit 2.

Figure 6A:
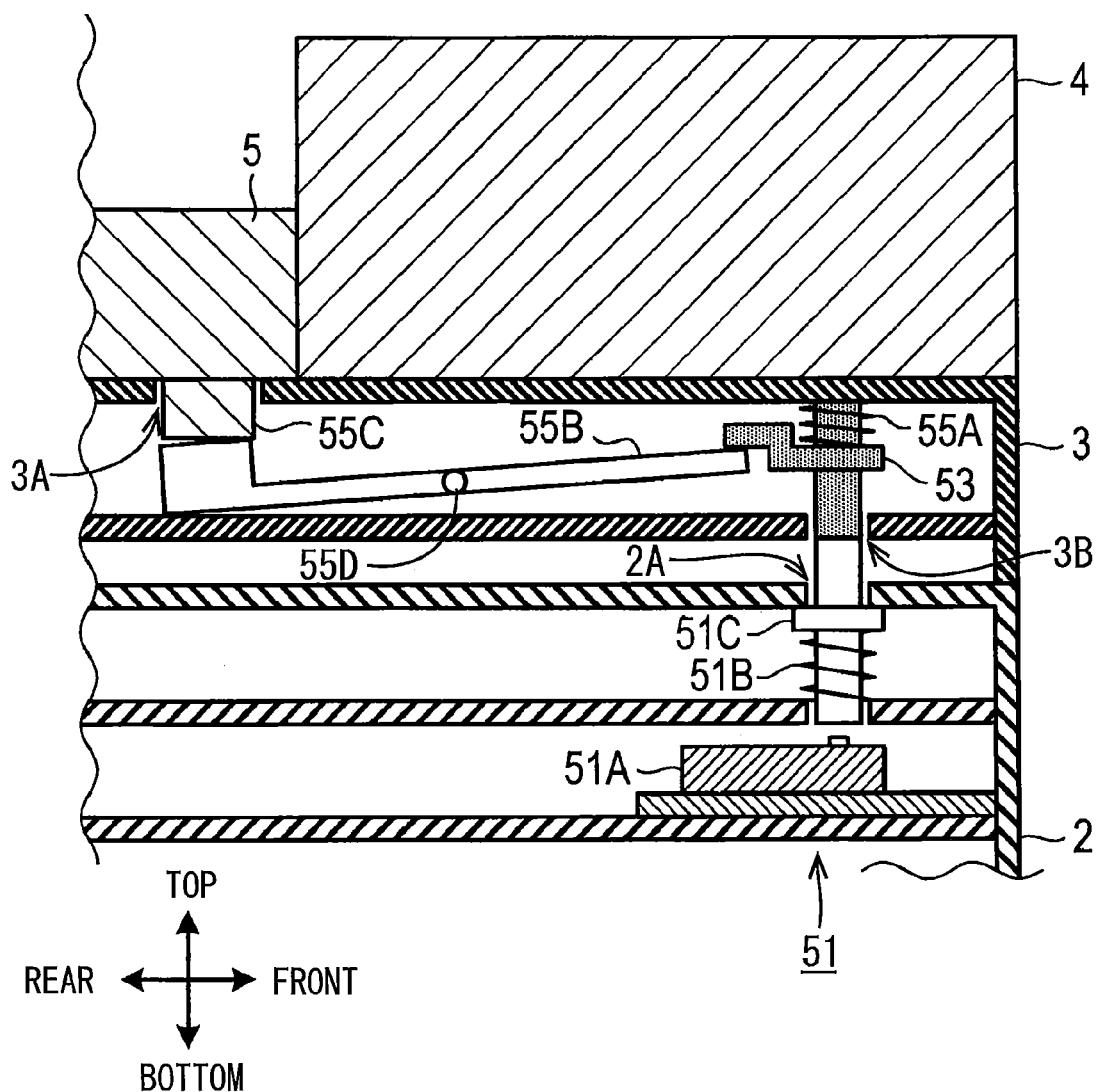
FIG. 6A is a cross-sectional view of the first detection section when the multifunction peripheral is in the state B.

First, the first detection section 51 will be described. The abutting section 55C is a protrusion provided on a lower surface of the conveyance unit 4. As shown in FIGS. 5A and 6A, the protrusion of the abutting section 55A protrudes downward from an imaginary plane including a bottom surface of the conveyance unit 4 contacting the scanning unit 3 when the conveyance unit 4 is at the closing position. The abutting section 55C is formed such that an amount of protrusion thereof varies according to the opening-and-closing state of the cover member 5. That is, when the cover member 5 is at the closing position, the abutting section 55C is in a low protrusion state (See FIG. 5A) in which the amount of protrusion is relatively small. When the cover member 5 is at the opening position, the abutting section 55C is in a high protrusion state (See FIG. 6A) in which the amount of protrusion is relatively large, that is, larger than the amount of protrusion in the low protrusion state.

The first movable member 53 is supported movably in an up-down direction in the scanning unit 3. As shown in FIG. 5A, the first movable member 53 is positioned at a lower position due to an elastic force from a coil spring 55A when no external force is applied through the operation transmission section 55B. The operation transmission section 55B is supported swingably about a shaft 55D positioned at the center thereof. A front end of the operation transmission section 55B is positioned so as to be able to interfere with (moves) the rear end of the first movable member 53 to upward from a lower side. A rear end of the operation transmission section 55B is located at a position corresponding to the abutting section 55C in the front-rear direction and in the left-right direction. A through-hole 3A is provided in an area of the upper surface of the scanning unit 3 that corresponds to the abutting section 55C in the front-rear direction and in the left-right direction.

The abutting section 55C is inserted into the through-hole 3A of the scanning unit 3 when the conveyance unit 4 is at the closing position, that is, the conveyance unit 4 closed the scanning unit 3. As shown in FIG. 5A, when the abutting section 55C is in the low protrusion state, that is, the cover member 5 is at the closing position, the abutting section 55C does not contact to the operation transmission section 55B, and thus the operation transmission section 55B does not interfere with (moves upward) the rear end of the first movable member 53. That is, the first movable member 53 is at the lower position.

Figure 6B:
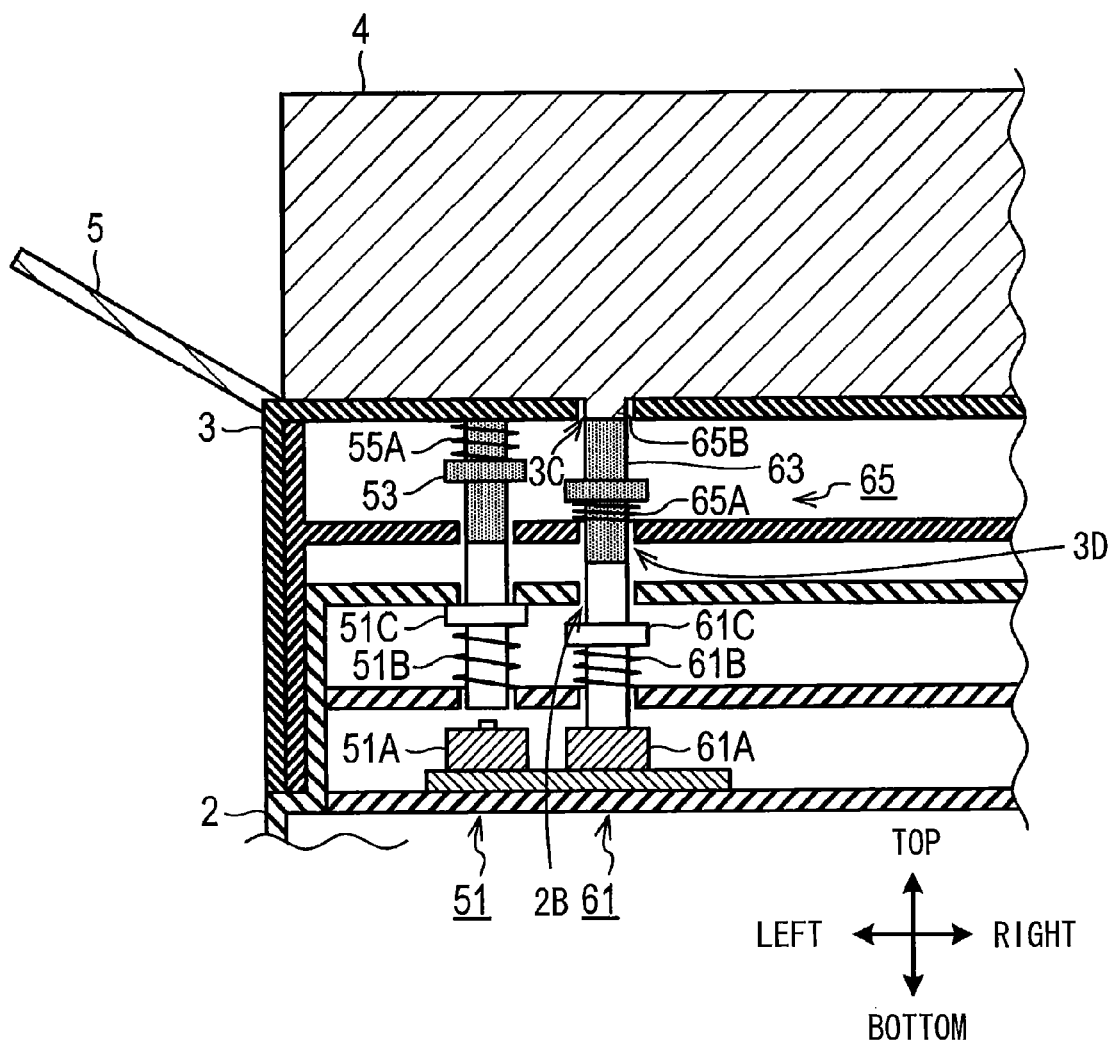
FIG. 6B is a cross-sectional view of the first detection section and the second detection section when the multifunction peripheral is in the state B.

When the abutting section 55C is in the high protrusion state, that is, the cover member 5 is at the opening position, as shown in FIGS. 6A and 6B, the abutting section 55C contacts to the operation transmission section 55B, pressing down the rear end of the operation transmission section 55B. Accordingly, the front end of the operation transmission section 55B goes up, moving the first movable member 53 to an upper position.

Figure 7A:
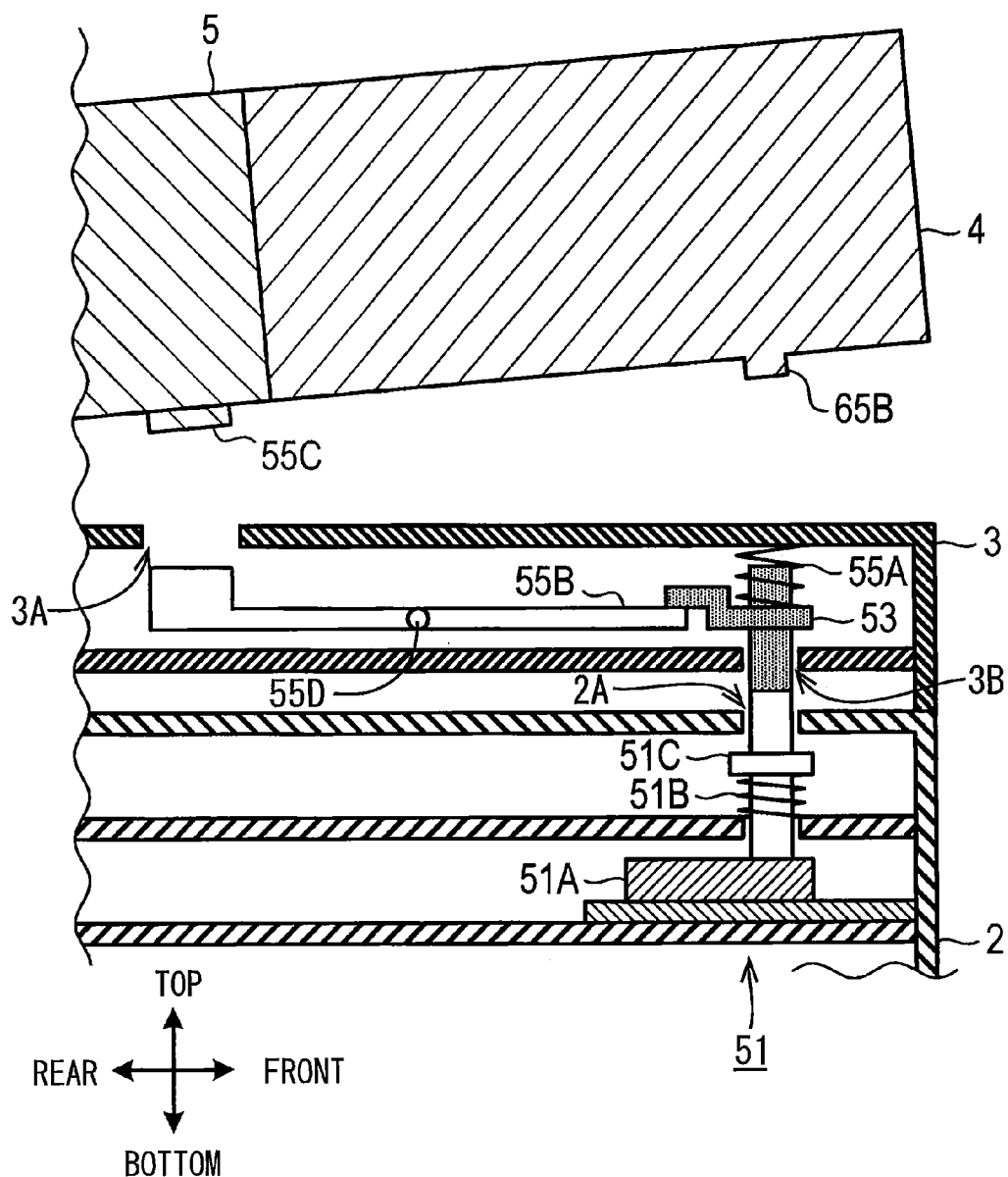
FIG. 7A is a cross-sectional view of the first detection section when the multifunction peripheral is in the state C.

As shown in FIG. 7A, when the conveyance unit 4 is at the opening position, that is, the conveyance unit 4 is opens the scanning unit 3, the abutting section 55C is not inserted in the through-hole 3A of the scanning unit 3, and does not contact to the operation transmission section 55B.

That is, when the conveyance unit 4 is at the closing position, and when the cover member 5 is at the opening position, the first movable member 53 moves to the upper position. The first movable member 53 is so formed as to move to the lower position at a time when at least either the conveyance unit 4 or the cover member 5 is at the other positions (that is, when the conveyance unit 4 is at the opening position or the cover member is at the closing position).

The elevator member 51C is located at a position corresponding to the first movable member 53 in the main body unit 2 in the front-rear direction and in the left-right direction. The elevator member 51C is supported movably in the up-down direction. As shown in FIGS. 6A and 6B, the elevator member 51C is positioned at an upper position due to an elastic force from a coil spring 51B when no external force is applied through the first movable member 53. The first switch 51A is positioned below the elevator member 51C in the main body unit 2. The first switch 51A is located in the distant relationship to the elevator member 51C such that the first switch 51A does not contact to the elevator member 51C and is turned OFF when the elevator member 51C is at the upper position (See FIGS. 6A and 6B), and such that the first switch 51A contacts to the elevator member 51C and is turned ON when the elevator member 51C is at a lower position (See FIG. 5A). A through-hole 3B is provided in an area of the lower surface of the scanning unit 3 that corresponds to the first movable member 53 in the front-rear direction and in the left-right direction. The lower end of the first movable member, 53 is inserted in the through-hole 3B. A through-hole 2A is provided in an area of the upper surface of the main body unit 2 that corresponds to the elevator member 51C in the front-rear direction and in the left-right direction. The upper end of the elevator member 51 is inserted in the through-hole 2A.

When, as shown in FIGS. 6A and 6B, the scanning unit 3 is at the closing position, that is, when the scanning unit 3 is closing the main body unit 2, and when the first movable member 53 is at the upper position, the elevator member 51C moves upward together with the first movable member 53. The elastic force of the coil spring 55A is set greater than the elastic force of the coil spring 51B. When the first movable member 53 is at the lower position, the elevator member 51C contacting to the first movable member 53 moves to the lower position (See FIG. 5A), and the first switch 51A is turned ON.

Figure 8A:
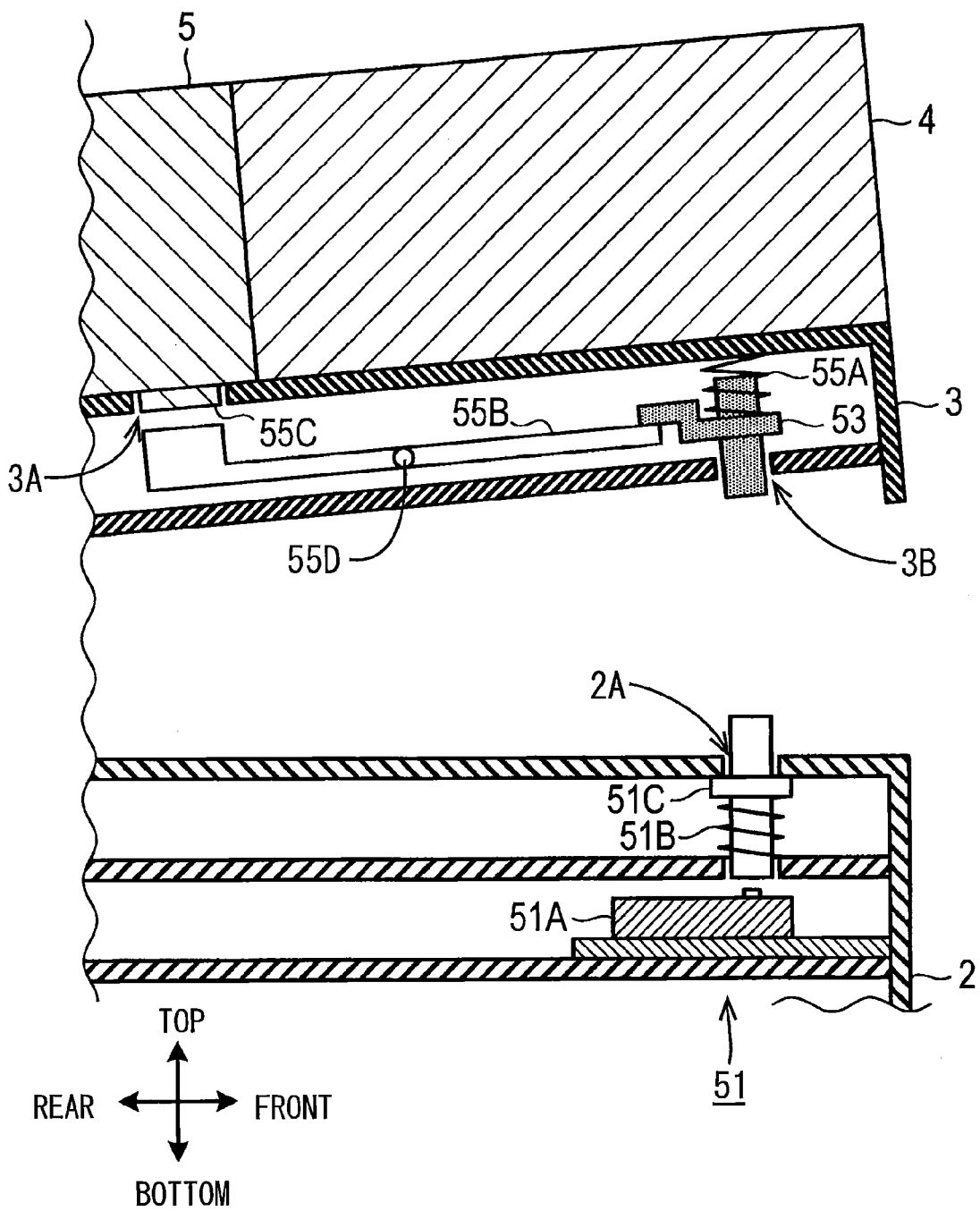
FIG. 8A is a cross-sectional view of the first detection section when the multifunction peripheral is in the state D.

That is, when the scanning unit 3 is at the closing position, and when the first movable member 53 is at the lower position, the elevator member 51C is at the lower position, turning the first switch 51A ON. When the scanning unit 3 is at the closing position, and when the first movable member 53 is at the upper position, the elevator member 51C is at the upper position, turning the first switch 51A OFF. When, as shown in FIG. 8A, the scanning unit 3 is at the opening position, that is, when the scanning unit 3 opens the main body unit 2, the first movable member 53 does not contacts to the elevator member 51C.

Accordingly, when the first movable member 53 is at the lower position, and when the scanning unit 3 is at the closing position, the first switch 51A is ON. When at least either the first movable member 53 or the scanning unit 3 is at the other positions (that is, the first movable member 53 is at the upper position or the scanning unit 3 is opening position), the first switch 51A is OFF. That is, the first switch 51A is ON when at least one of the following conditions (1) and (2) is satisfied: The condition (1) is that the scanning unit 3, the conveyance unit 4, and the cover member 5 are all at the closing positions.

The condition (2) is that the scanning unit 3 is at the closing position, and the conveyance unit 4 is at the opening position. The first switch 51A is OFF when at least one of the following conditions (3) and (4) is satisfied: The condition (3) is that the scanning unit 3 and the conveyance unit 4 are at the closing positions, and the cover member 5 is at the opening position. The condition (4) is that the scanning unit 3 is at the opening position.

Figure 7B:
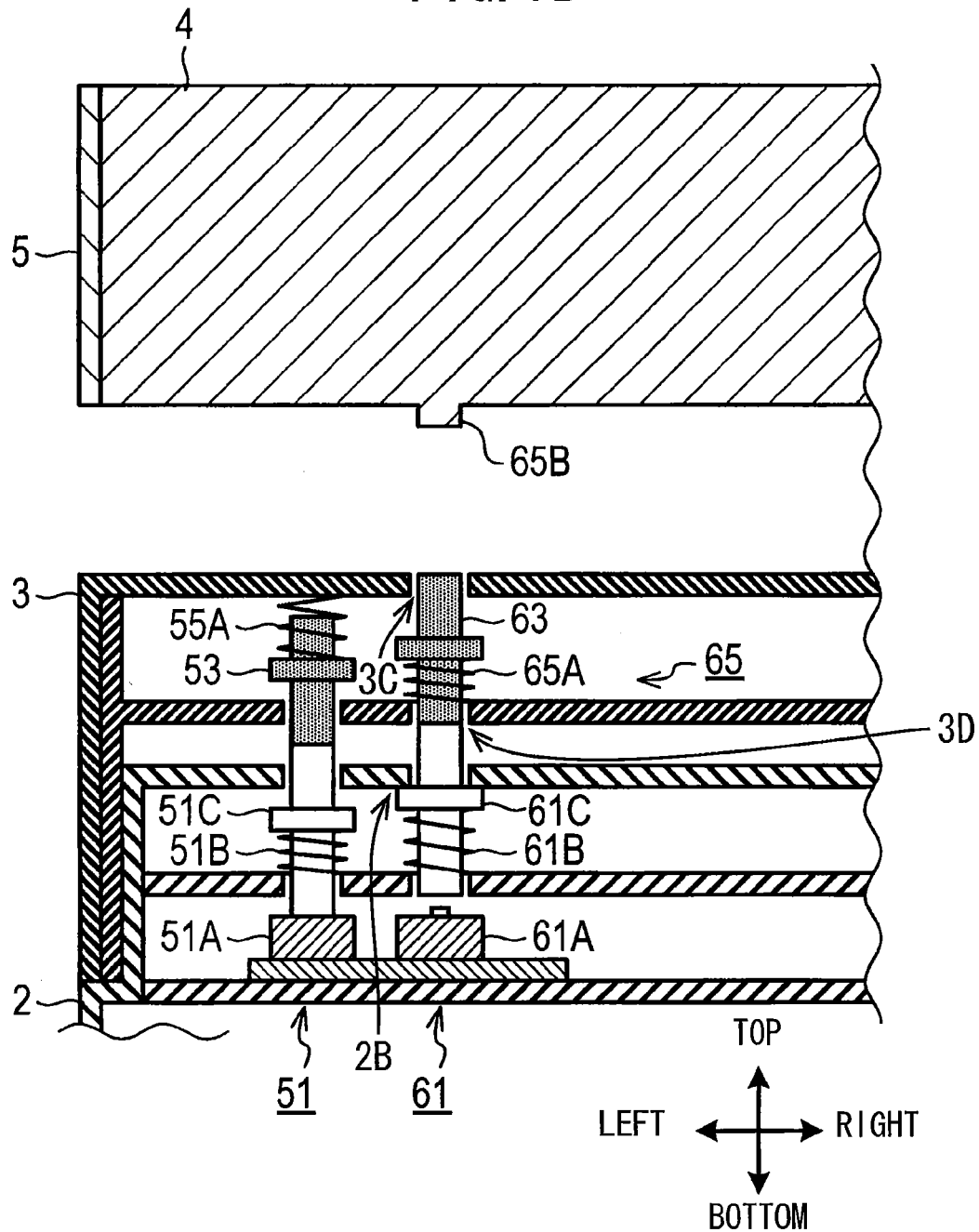
FIG. 7B is a cross-sectional view of the first detection section and the second detection section when the multifunction peripheral is in the state C.

The following describes the second detection section 61. As shown in FIG. 5B, the pressing section 65B is a protrusion provided on a lower surface of the conveyance unit 4. Unlike the abutting section 55C, an amount of protrusion of the pressing section 65B is kept at a constant level. The second movable member 63 is supported movably in the up-down direction in the scanning unit, 3. As shown in FIG. 7B, the second movable member 63 is positioned at an upper position due to an elastic force from a coil spring 65A when no external force is applied through the pressing section 65B. A through-hole 3C is provided in a region of the upper surface of the scanning unit 3 corresponding to the pressing section 65B in the front-rear direction and in the left-right direction. The upper end of the second movable member 63 is inserted in the through-hole 3C.

When the conveyance unit 4 is at the opening position as shown in FIG. 7B, that is, when the conveyance unit 4 opens the scanning unit 3, the pressing section 65B does not contact the second movable member 63, regardless of the opening-and-closing state of the cover member 5. In this case, the second movable member 63 is at the upper position.

When the conveyance unit 4 is at the closing position as shown in FIG. 5B, that is, when the conveyance unit 4 is closes the scanning unit 3, the pressing section 65B contacts the second movable member 63, and moves the second movable member 63 to the lower position lower than the upper position, regardless of the opening-and-closing state of the cover member 5.

The elevator member 61C is disposed at a position corresponding to the second movable member 63 in the main body unit 2 in the front-rear direction and in the left-right direction. The elevator member 61C is supported movably in the up-down direction. As shown in FIG. 7B, the elevator member 61C is positioned at an upper position due to an elastic force from a coil spring 61B when no external force is applied through the second movable member 63. The second switch 61A is positioned below the elevator member 61C in the main body unit 2. The second switch 61A is located in the distant relationship to the elevator 51C such that the second switch 61A does not contact to the elevator member 61C and is turned OFF when the elevator member 61C is at the upper position (See FIG. 7B), and that the second switch 61A contacts to the elevator member 61C and is turned ON when the elevator member 61C is at a lower position (See FIG. 5B). A through-hole 3D is provided in a region of the lower surface of the scanning unit 3 corresponding to the second movable member 63 in the front-rear direction and in the left-right direction. The lower end of the second movable member 63 is inserted in the through-hole 3D. A through-hole 2B is provided in a region of the upper surface of the main body unit 2 corresponding to the elevator member 61C in the front-rear direction and in the left-right direction. The upper portion of the elevator member 61C is inserted in the through hole 2B.

When, as shown in FIG. 7B, the scanning unit 3 is at the closing position, that is, when the scanning unit 3 closes the main body unit 2, and when the second movable member 63 is at the upper position, the elevator member 61C moves upward together with the second movable member 63. When, as shown in FIG. 5B, the second movable member 63 is at the lower position, the elevator member 61C contacting to the second movable member 63 moves to the lower position, and the second switch 61A is turned ON.

That is, when the scanning unit 3 is at the closing position, and when the second movable member 63 is at the lower position, the elevator member 61C is at the lower position, turning the second switch 61A ON. When the scanning unit 3 is at the closing position, and when the second movable member 63 is at the upper position, the elevator member 61C is at the upper position, turning the second switch 61A OFF.

Figure 8B:
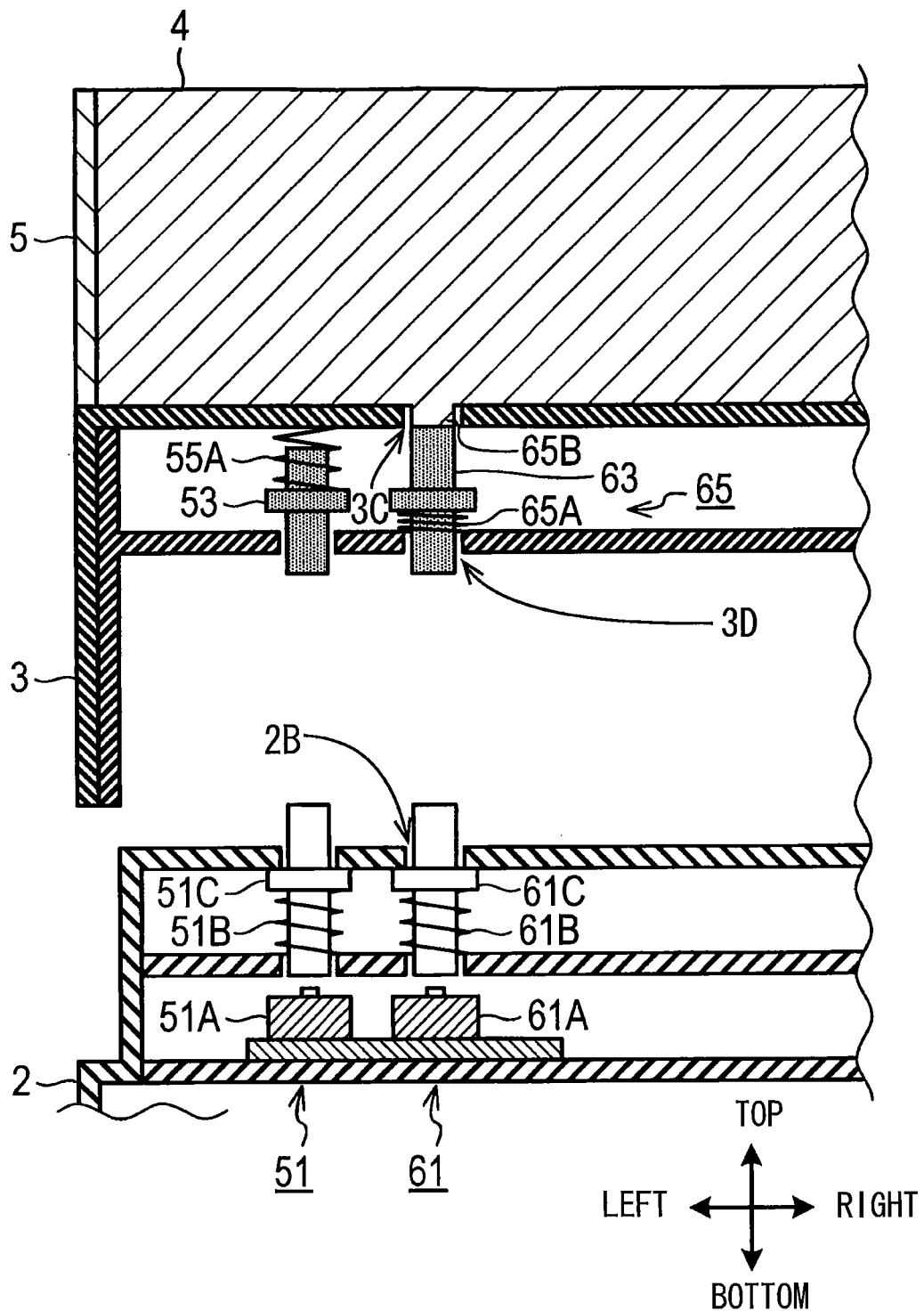
FIG. 8B is a cross-sectional view of the first detection section and the second detection section when the multifunction peripheral is in the state D.

On the other hand, when, as shown in FIG. 8B, the scanning unit 3 is at the opening position, that is, when the scanning unit 3 opens the main body unit 2, the second movable member 63 does not contact to the elevator member 61C.

Accordingly, when the second movable member 63 is at the lower position, and when the scanning unit 3 is at the closing position, the second switch 61A is ON. When at least either the second movable member 63 or the scanning unit 3 is at the other positions, the second switch 61A is OFF. That is, the second switch 61A is ON when both the scanning unit 3 and the conveyance unit 4 are at the closing positions. The second switch 61A is OFF when either the scanning unit 3 or the conveyance unit 4 is at the opening position.

The first switch 51A and the second switch 61A are turned ON and OFF under different conditions. Four states are realized by the ON-and-OFF states of the first switch 51A and second switch 61A. Hereinafter, a situation where both the first switch 51A and the second switch 61A are ON is referred to as state A. A situation where the first switch 51A is OFF, and the second switch 61A ON is referred to as state B. A situation where the first switch 51A is ON, and the second switch 61A OFF is referred to as state C. A situation where both the first switch 51A and the second switch 61A are OFF is referred to as state D. FIG. 9 shows what has been described above, that is, the opening-and-closing states of the scanning unit 3, the conveyance unit 4, and the cover member 5 in each of the states A to D.

3. Electrical Configuration of Multifunction Peripheral

As shown in FIG. 10, the multifunction peripheral 1 includes a control section 71, a device control section 73, a first analog front end (referred to as AFE, hereinafter) 74, a second AFE 75, a first drive circuit 78, and a second drive circuit 79. These components 71, 73, 74, 75, 78, and 79 are connected to the operation section 7, the display section 9, the various sensors 17 to 19, and the various switches 51A and 61A via a bus 80. The control section 71 includes a CPU 70, a ROM 76, and a RAM 77.

In the ROM 76, various programs that are used to control operation of the multifunction peripheral 1 are stored. The CPU 70 controls each component in accordance with a program loaded from the ROM 76, and performs a reading process described later. In the ROM 76, various error messages, which will be described later, are stored.

The device control section 73 is connected to the image forming section 8 and the reading units 21 and 22. Based on instructions from the CPU 70, the device control section 73 transmits a formation control signal to the image forming section 8. Based on instructions from the CPU 70, the device control section 73 also transmits a reading control signal to the reading units 21 and 22. Based on the formation control signal from the device control section 73, the image forming section 8 forms an image on a to-be-printed object. The reading units 21 and 22 read a top or back surface of a document based on the reading control signal from the device control section 73.

The reading units 21 and 22 repeat a reading operation a plurality of times with respect to the main-scanning direction at the reading positions L1 and L2 of the conveying path 47 when a document conveyed along the conveying path 47 is read. The reading units 21 and 22 acquire a unit of read data during one main-scanning-direction reading operation. By repeating the main-scanning-direction reading operation, the reading units 21 and 22 acquire read data in which a plurality of units of read data is arranged in the sub-scanning direction. The reading units 21 and 22 output the acquired read data to the AFEs 74 and 75.

The first AFE 74 is connected to the first reading unit 21. The second AFE 75 is connected to the second reading unit 22. Based on instructions from the CPU 70, the first AFE 74 (second AFE 75) converts analog-signal read data that is output from the first reading unit 21 (second reading unit 22) into digital signals, or read data of gradation data. Similarly, the second AFE 75 is connected to the second reading unit 22. Based on instructions from the CPU 70, the second AFE 75 converts analog-signal read data that is output from the second reading unit 22 into digital signals. The first AFE 74 and the second AFE 75 stores the converted gradation data in the RAM 77 via the bus 80.

The first drive circuit 78 is connected to the motor M1. Based on a pulse signal input from the CPU 70, the first drive circuit 78 drives and rotates the motor M1. The motor M1 (motor M2) is rotated or driven by a one-step rotation angle in response to one pulse of the pulse signal. As the motor M1 is driven by one step, the various rollers that constitute the conveyance section 48 are rotated by predetermined angles, and a document is conveyed a predetermined distance on the conveying path 47. When conveying and reading a document, the CPU 70 transmits the pulse signal to the first drive circuit 78. The first drive circuit 78 moves the document by a distance calculated by multiplying the number of pulses of the pulse signal by a predetermined distance. Hereinafter, the number of pulses of the pulse signal that the CPU 70 transmits to the motor M1 (motor M2) is referred to as number of steps.

The second drive circuit 79 is connected to the motor M2. Based on a pulse signal input from the CPU 70, the second drive circuit 79 drives and rotates the motor M2. As the motor M2 is driven by one step, various gears (not shown) are rotated by predetermined angles, and the first reading unit 21 conveys a predetermined distance in the sub-scanning direction. When reading a document placed on the first platen glass 25, the CPU 70 transmits the pulse signal to the second drive circuit 79. The second drive circuit 79 moves the first reading unit 21 by a distance calculated by multiplying number of steps thereof by a predetermined distance.

4. Reading Process

Figure 11:
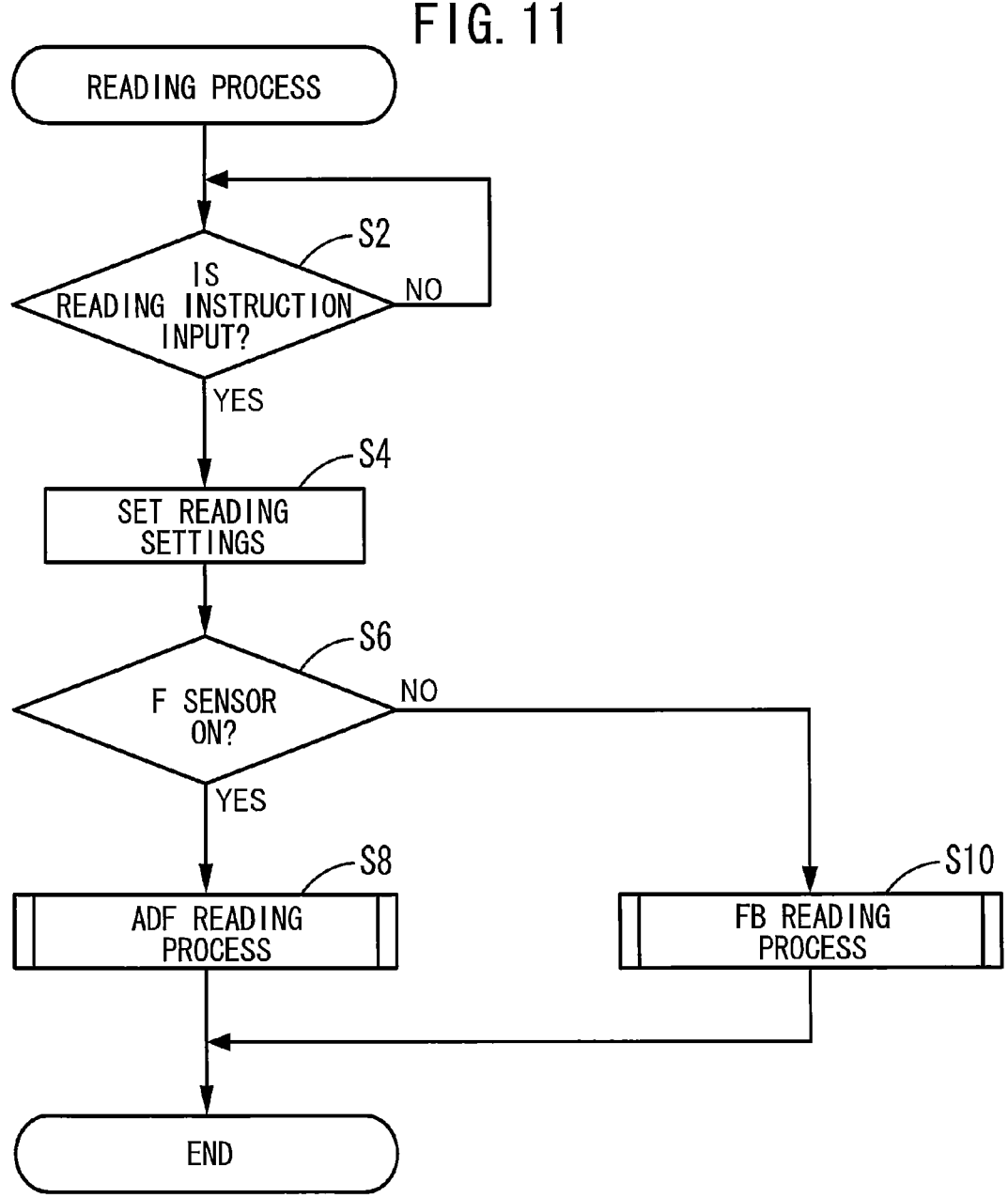
FIG. 11 is a flowchart illustrating a reading process.

The following describes a document reading process with reference to FIGS. 11 to 16. FIG. 11 is a flowchart of the reading process that the CPU 70 performs in accordance with a predetermined program. The CPU 70 waits for a document reading instruction that is input by a user through the operation section 7 (S2: NO). After the reading instruction is input (S2: YES), in S4 the CPU 70 accepts reading settings such as a document size and a reading surface of a document (a top surface or a back surface), along with the reading instruction.

In S6, the CPU 70 determines, by using the F sensor 18, whether a document is placed on the document table 12. If the CPU 70 detects that the F sensor 18 is ON when the reading instruction is input, and that the document is placed on the document table 12 (S6: YES), in S8 the CPU 70 starts an automatic document feed reading process (referred to as ADF reading process, hereinafter) in which the conveyance section 48 of the conveyance unit 4 is used to convey and read the document.

Figure 12:
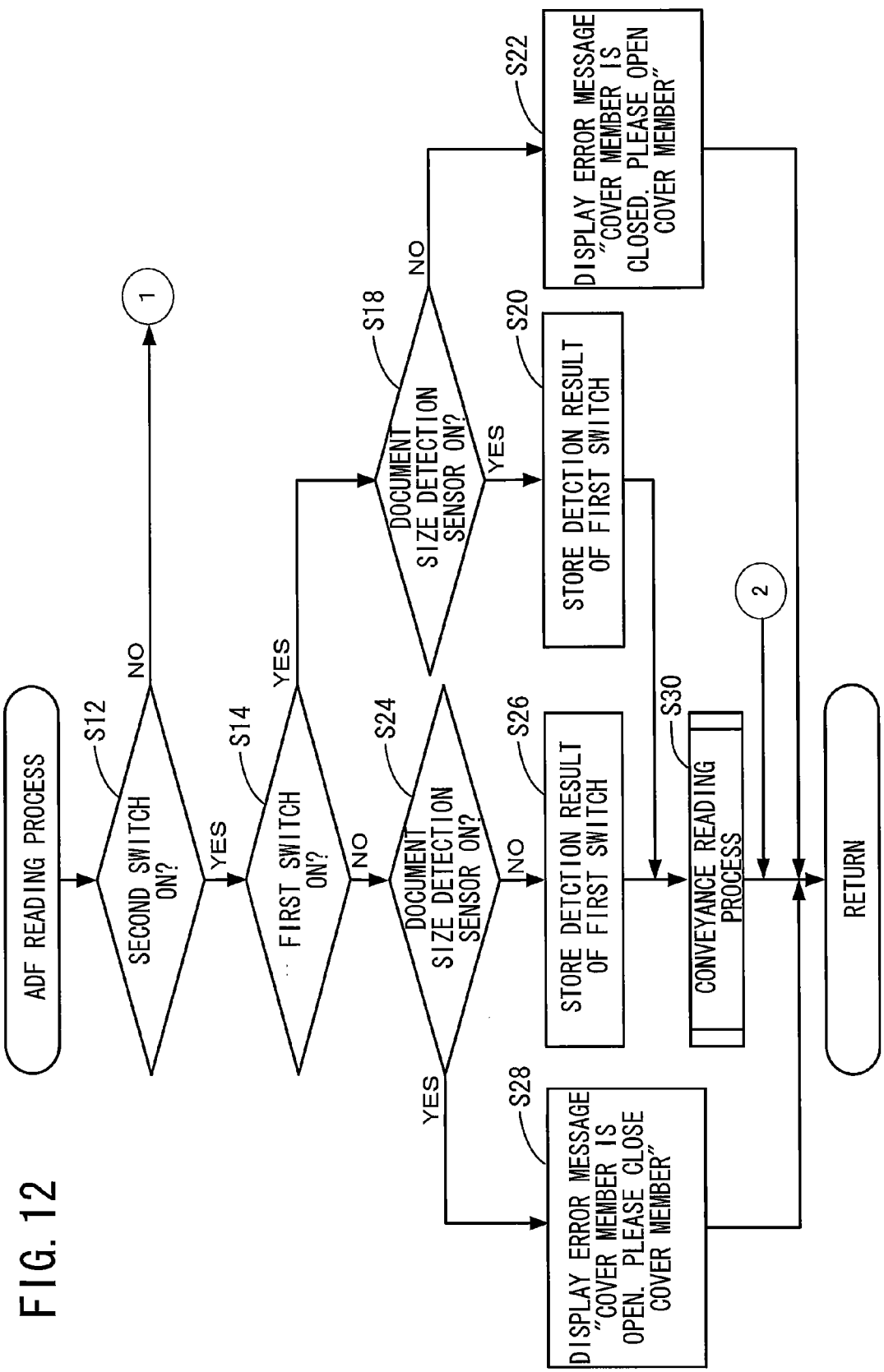
FIG. 12 is a flowchart illustrating a part of an ADF reading process.
Figure 13:
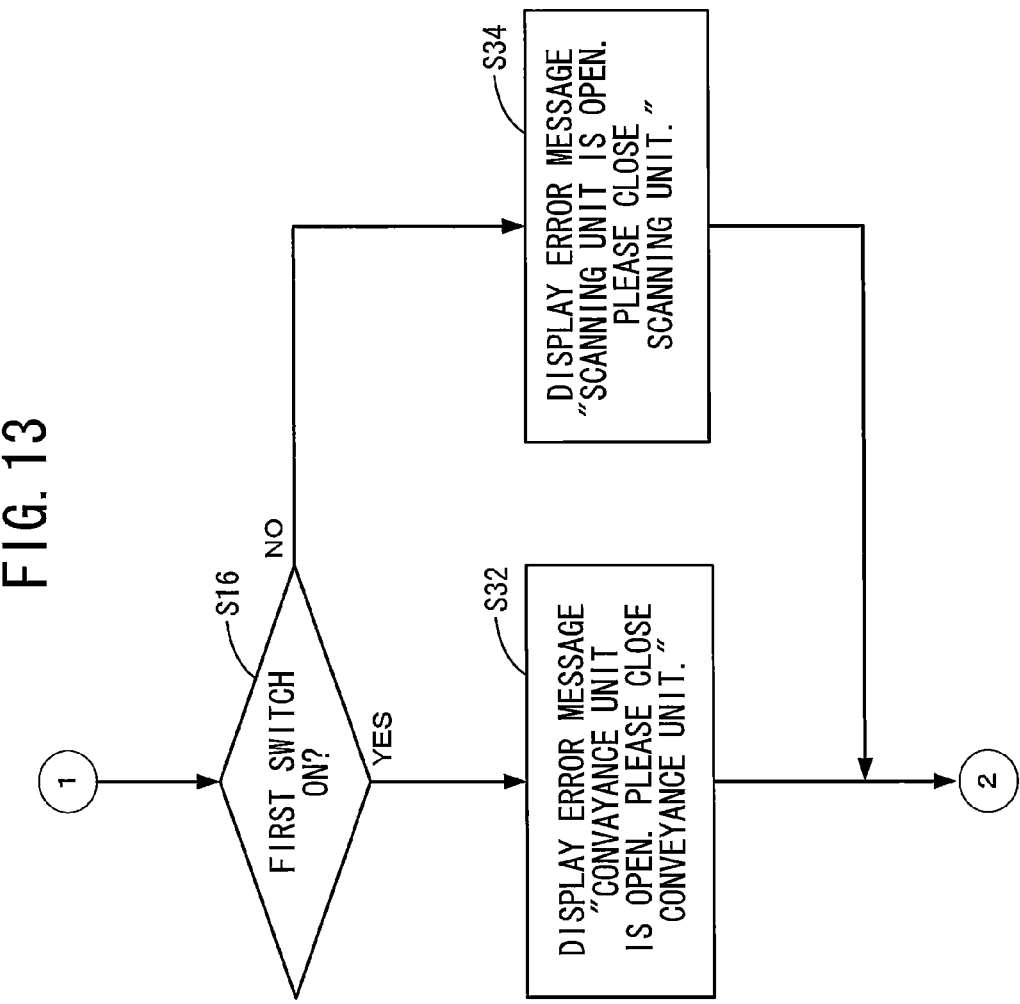
FIG. 13 is a flowchart illustrating a remaining part of the ADF reading process.

FIGS. 12 and 13 show a flowchart of the ADF reading process. In the ADF reading process, the CPU 70 first checks the state of the first switch 51A and the state of the second switch 61A (S12 to S16). That is, in S12, the CPU 70 determines whether the state of the second switch 61A is ON. If the second switch 61A is ON (S12: YES), the CPU 70 detects that the opening-and-closing state of the scanning unit 3, the conveyance unit 4, and the cover member 5 (which are collectively referred to as an opening-and-closing section, hereinafter) is the state A or B, that is, the scanning unit 3 and the conveyance unit 4 are at the closing positions. Since the scanning unit 3 and the conveyance unit 4 are at the closing positions, the CPU 70 judges that the document can be conveyed by the conveyance section 48.

In S14, the CPU 70 determines whether the state of the first switch 51A is ON. If the first switch 51A is ON (S14: YES), the CPU 70 detects that the opening-and-closing state of the opening-and-closing section is the state A, that is, the conveyance section 48 can convey the document by using the first conveying path 47A.

In S18, the CPU 70 determines whether the document size detection sensor 17 is ON. If the document size detection sensor 17 is ON (S18: YES), the CPU 70 detects that the document is a large document. In the multifunction peripheral 1 of the embodiment, the width of the opening section 4A is set to be substantially equal to the document width of a postcard, and large documents can be conveyed by the first conveying path 47A, but cannot be conveyed by the second conveying path 47B. Therefore, if the document is a large document, the CPU 70 then determines that the document will be conveyed by the first conveying path 47A.

That is, if the document size detection sensor 17 is ON (S18: YES), the CPU 70 detects that both the opening-and-closing state of the opening-and-closing section and the detection result of the document size detection sensor 17 indicate that the document should be conveyed by using the first conveying path 47A. In this case, in S20 the CPU 70 stores, in the RAM 77, the detection result of the first switch 51A that indicates that the document should be conveyed by using the first conveying path 47A, and in S30 performs a conveyance reading process including a document conveyance instruction by using the first conveying path 47A.

On the other hand, if the document size detection sensor 17 is OFF (S18: NO), the CPU 70 detects that the document conveyed along the first conveying path 47A is a small document. In the multifunction peripheral 1 of the embodiment, if a small document is conveyed along the first conveying path 47A, the first conveying path 47A would likely be jammed as the document goes along the second conveyance roller 44 on the first conveying path 47A. Therefore, if the document is a small document, the CPU 70 then determines that the document will be conveyed by the second conveying path 47B.

That is, if the document size detection sensor 17 is OFF (S18: NO), the CPU 70 detects that the conveying path (47A) indicated by (determined from) the opening-and-closing state of the opening-and-closing section does not coincide with (conflicts with) the conveying path (47B) indicated by (determined from) the detection result of the document size detection sensor 17. In this case, based on the detection result of the document size detection sensor 17, in S22 the CPU 70 displays, on the display section 9, an error message saying, "The cover member is closed. Please open the cover member". Subsequently, the CPU 70 ends the ADF reading process and reading process without giving a document conveyance instruction.

If the switch 51A is OFF (S14: NO), the CPU 70 detects that the opening-and-closing state of the opening-and-closing section is the state B, that is, the conveyance section 48 can convey the document by using the second conveying path 47B.

In S24, the CPU 70 determines whether the document size detection sensor 17 is ON. If the document size detection sensor 17 is OFF (S24: NO), the CPU detects that both the opening-and-closing state of the opening-and-closing section and the detection result of the document size detection sensor 17 indicate that the document should be conveyed by using the second conveying path 47B. In this case, in S26 the CPU 70 stores, in the RAM 77, the detection result of the first switch 51A that indicates that the document should be conveyed by using the second conveying path 47B, and in S30 performs a conveyance reading process including a document conveyance instruction by using the second conveying path 47B.

If the document size detection sensor 17 is ON (S24: YES), the CPU 70 detects that the conveying path (47B) indicated by the opening-and-closing state of the opening-and-closing section does not coincide with (conflicts with) the conveying path (47B) indicated by the detection result of the document size detection sensor 17. In this case, based on the detection result of the document size detection sensor 17, in S28 the CPU 70 displays, on the display section 9, an error message saying, "The cover member is open. Please close the cover member". Subsequently, the CPU 70 ends the ADF reading process and reading process without giving a document conveyance instruction.

If the second switch 61A is OFF (S12: NO), the CPU 70 detects that the opening-and-closing state of the opening-and-closing section is the state C or D, that is, either the scanning unit 3 or the conveyance unit 4 is at the opening position. Since either the scanning unit 3 or the conveyance unit 4 is at the opening position, the CPU 70 determines that the document cannot be conveyed by the conveyance section 48.

Then, in S16 the CPU 70 determines whether the state of the first switch 51A is ON. If the first switch 51A is ON (S16: YES), the CPU 70 detects that the opening-and-closing state of the opening-and-closing section is the state C, that is, the conveyance unit 4 is at the opening position. In this case, in S32 the CPU 70 displays, on the display section 9, an error message saying, "The document conveyance unit is open. Please close the document conveyance unit". Subsequently, the CPU 70 ends the ADF reading process and reading process without giving a document conveyance instruction.

If the first switch 51A is OFF (S16: NO), the CPU 70 detects that the opening-and-closing state of the opening-and-closing section is the state D, that is, at least the scanning unit 3 is at the opening position. In this case, in S34 the CPU 70 displays, on the display section 9, an error message saying, "The reading unit is open. Please close the reading unit". Subsequently, the CPU 70 ends the ADF reading process and reading process without giving a document conveyance instruction.

Figure 14:
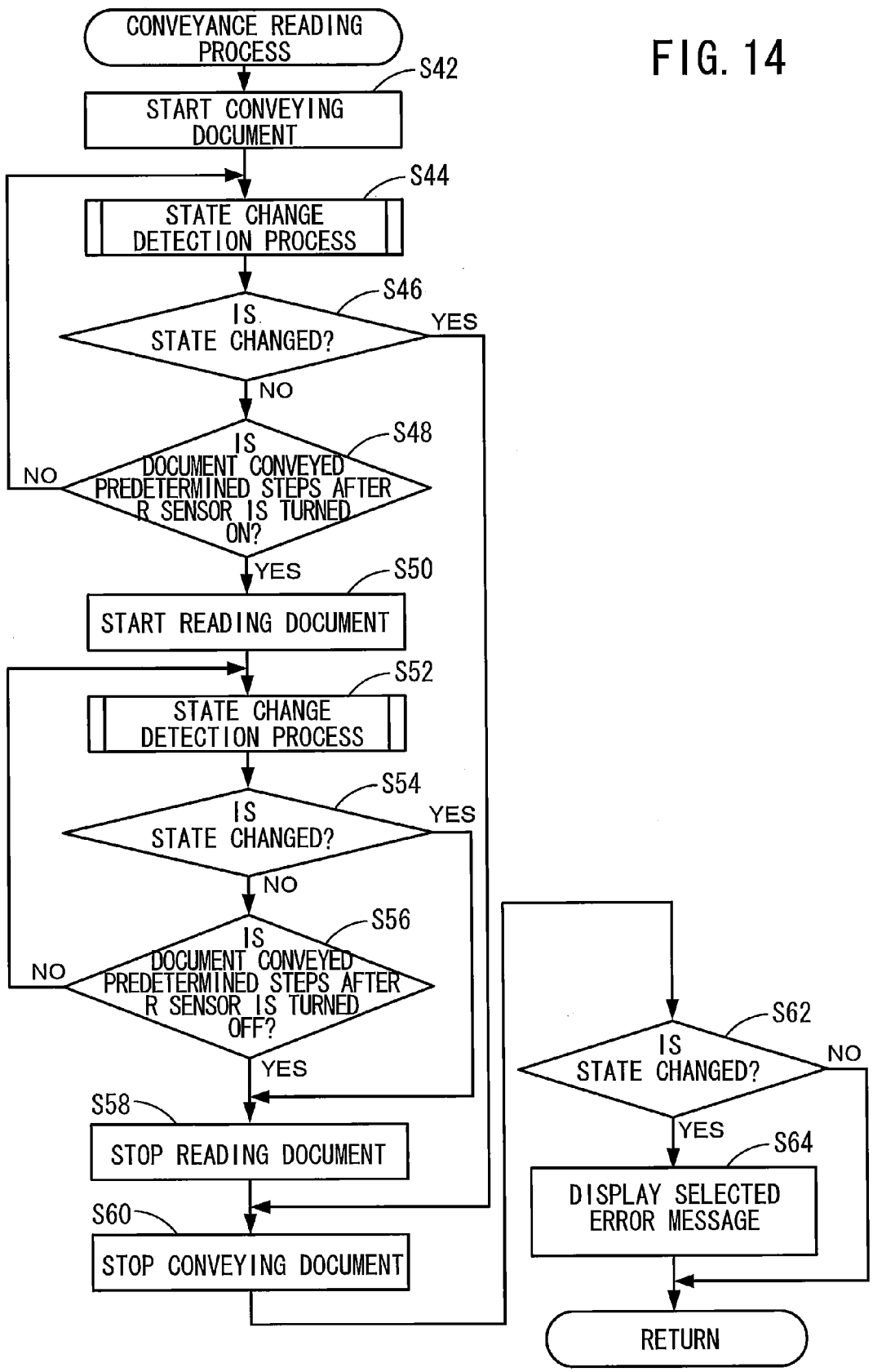
FIG. 14 is a flowchart illustrating a conveyance reading process.

The following describes the conveyance reading process. FIG. 14 shows a flowchart of the conveyance reading process. In the conveyance reading process, in S42 the CPU 70 first instructs the conveyance section 48 to convey a document, thereby starting a process of conveying the document. Then, in S44 the CPU 70 starts a state change detection process to detect a change in the state of the first switch 51A and the state of the second switch 61A after starting conveying the document.

Figure 15:
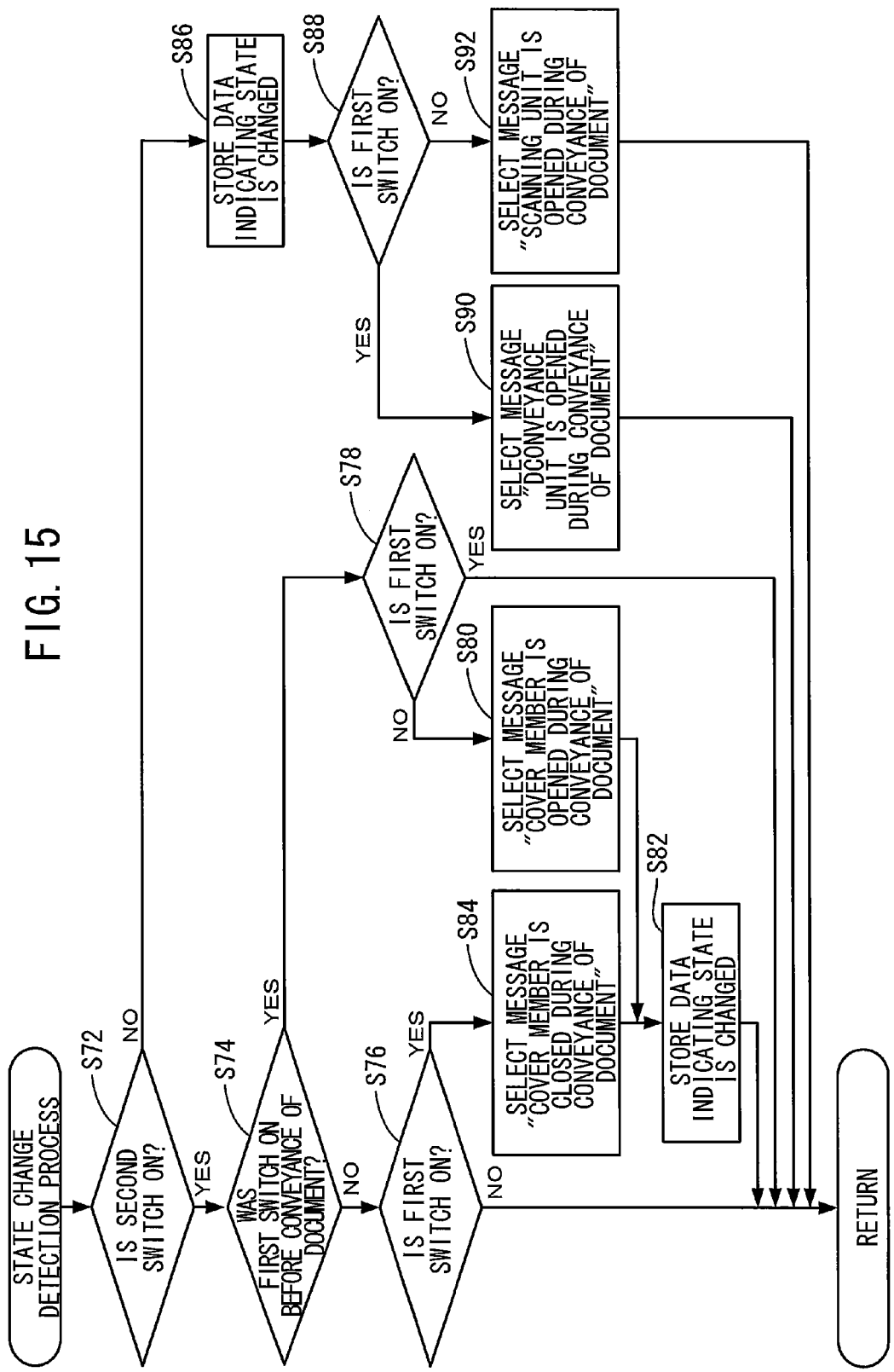
FIG. 15 is a flowchart illustrating a state change detection process.

FIG. 15 shows a flowchart of the state change detection process. In the conveyance reading process, in S72 the CPU 70 determines whether the state of the second switch 61A is ON. If the second switch 61A is ON (S72: YES), the CPU 70 detects that the scanning unit 3 and the conveyance unit 4 still remain at the closing positions.

Then, the CPU 70 carries out a process of comparing the detection result of the first switch 51A that is obtained before the conveyance of the document is started with the detection result of the first switch 51A that is obtained after the conveyance of the document is started (S74 to S78). That is, in S74, the CPU 70 reads, from the RAM 77, the detection result of the first switch 51A that is stored in S20 or S26 before the conveyance of the document is started, and determines whether the read detection result is ON (whether the first switch 51A was ON). Then, in S76 or S78, the CPU 70 detects the latest state of the first switch 51A after the conveyance of the document is started.

If there is no change between the detection results of the first switch 51A that are obtained before and after the conveyance of the document is started, then the CPU 70 judges that there is no change in the state of the first switch 51A and the state of the second switch 61A, and ends the state change detection process. Here, the cases where there is no change between the detection results of the first switch 51A that are obtained before and after the conveyance of the document is started include a case (S74: YES, S78: YES) where the first switch 51A remains ON around the time when the conveyance of the document is started, and a case (S74: NO, S76: NO) where the first switch 51A remains OFF around the time when the conveyance of the document is started.

On the other hand, if there is a change between the detection results of the first switch 51A obtained before and after the conveyance of the document is started, then the CPU 70 detects how the state of the first switch 51A is changed. If the first switch 51A is ON before the conveyance of the document is started, and the first switch 51A is OFF after the conveyance of the document is started (S74: YES, S78: NO), the CPU 70 detects that the cover member 5 has been moved to the opening position after the conveyance of the document is started.

In this case, in S80 the CPU 70 selects an error message saying, "The cover member is opened during conveyance of a document". In this case, in S82, the CPU 70 stores, in the RAM 77, data indicating that the state has been changed (the state of the first switch 51A or the state of the second switch 61A has been changed), and ends the state change detection process.

If the first switch 51A is OFF before the conveyance of the document is started, and the first switch 51A is ON after the conveyance of the document is started (S74: NO, S76: YES), the CPU 70 detects that the cover member 5 has been moved to the closing position after the conveyance of the document is started.

In this case, in S84 the CPU 70 selects an error message saying, "The cover member is closed during conveyance of a document". In this case, in S82, the CPU 70 stores, in the RAM 77, the data indicating that the state has been changed, and ends the state change detection process.

If the second switch 61A is OFF (S72: YES), the CPU 70 detects that either the scanning unit 3 or the conveyance unit 4 has been moved to the opening position. In this case, in S86, the CPU 70 stores data indicating that the state has been changed (the state of the first switch 51A or the state of the second switch 61A has been changed). And in S88 checks the state of the first switch 51A after the conveyance of the document is started. The CPU 70 detects whether the scanning unit 3 or the conveyance unit 4 has been moved to the opening position.

The CPU 70 detects the latest state of the first switch 51A after the conveyance of the document is started, and determines whether the latest state of the first switch 51A is ON. If the first switch 51A is ON after the conveyance of the document is started (S88: YES), the CPU 70 detects that the conveyance unit 4 has been moved to the opening position. In this case, in S90, the CPU 70 selects an error message saying, "The document conveyance unit is opened during conveyance of a document", and ends the state change detection process.

If the first switch 51A is OFF after the conveyance of the document is started (S88: NO), the CPU 70 detects that at least the scanning unit 3 has been moved to the opening position. In this case, in S92, the CPU 70 selects an error message saying, "The reading unit is opened during conveyance of a document", and ends the state change detection process.

After ending the state change detection process and returning to the conveyance reading process shown in FIG. 14, in S46 the CPU 70 checks if the change in the state has been stored in the RAM 77 during the state change detection process. That is, the CPU 70 determines whether the state has been changed. If the data indicating that the state has been changed is stored in the RAM 77 during the state change detection process (S46: YES), in S60 the CPU 70 instructs the conveyance section 48 to stop conveying the document, thereby stopping conveying the document. If the data indicating that the state has been changed is not stored in the RAM 77 during in the state change detection process (S46: NO), in S48 the CPU 70 waits until the R sensor 19 is turned ON and further waits until the document is conveyed by predetermined number of steps SP1 after the R sensor 19 is turned ON. In this case, the number of steps SP1 corresponds to a distance between the detection position Y along the conveying path 47, and the reading position L1.

If the R sensor 19 is not turned ON, or if the document is not conveyed by a predetermined number of steps after the R sensor 19 is turned ON (S48: NO), the CPU 70 repeats the process of S44 and the subsequent processes. If the R sensor 19 is turned ON, and if the document is conveyed by a predetermined number of steps after the R sensor 19 is turned ON (S48: YES), the CPU 70 instructs to start the reading operation. That is, the CPU 70 instructs the first reading unit 21 to read the document when the document has been moved by the number of steps SP1 since the R sensor 19 is turned ON, thereby starting reading a back surface of the document. Further, the CPU 70 monitors whether the document is conveyed by the predetermined number of steps SP2 after the R sensor 19 is turned ON. Here, the predetermined of steps SP2 corresponds to distance between the detection position Y and the reading position L2. When the document has been moved by the number of steps SP2 since the R sensor 19 is turned ON, in S50 the CPU 70 instructs the second reading unit 22 to read the document, thereby starting reading a top surface of the document.

Even after having started reading the document, in S52 the CPU 70 continues the state change detection process explained in step S44. That is, the CPU 70 repeatedly performs the state change detection process during a period of time from when the process of conveying the document is started until the process of reading the document is finished. If the data indicating that the state has been changed is stored in the RAM 77 during the state change detection process after the process of reading the document is started (S54: YES), in S58 the CPU 70 instructs the reading units 21 and 22 to stop reading the document, thereby stopping reading the document, and in S60 stops conveying the document. If the data indicating that the state has been changed is not stored in the RAM 77 during the state change detection process (S54: NO), in S56 the CPU 70 waits until the R sensor 19 is turned OFF and further waits until the document is conveyed by predetermined number of steps after the R sensor 19 is turned OFF.

If the R sensor 19 is not turned OFF, or if the document is not conveyed by a predetermined number of steps after the R sensor 19 is turned OFF (S56: NO), the CPU 70 repeats the process of S52 and the subsequent processes. If the R sensor 19 is turned OFF, and if the document is conveyed by predetermined number of steps after the R sensor 19 is turned OFF (S56: YES), in S58 the CPU 70 stops the reading operation. That is, the CPU 70 stops reading the back surface of the document when the document has been moved by the number of steps SP1 since the R sensor 19 is turned OFF, and stops reading the top surface of the document at a time when the document has been moved by the number of steps SP2 since the R sensor 19 is turned OFF. Furthermore, in S60 the CPU 70 conveys the document to the opening section 4A or 4C, and instructs the conveyance section 48 to stop conveying the document, thereby stopping conveying the document.

After the process of conveying the document is finished, in S62 the CPU 70 checks if the data indicating that the state has been changed is stored in the RAM 77 during the state change detection process while conveying the document. If the data indicating that the state has been changed is stored in the RAM 77 during the state change detection process (S62: YES), in S64 the CPU 70 displays, on the display section 9, the error message selected in the state change detection process (S80, S84, S90, or S92), and ends the conveyance reading process, the ADF reading process, and the conveyance process. If the change in the state has not been stored in the RAM 77 during the state change detection process (S62: NO), the CPU 70 ends the conveyance reading process, the ADF reading process, and the conveyance process, without displaying an error message.

On the other hand, during the reading process shown in FIG. 11, if the F sensor 18 is OFF when the reading instruction is input, and the CPU 70 detects that no document is placed on the document table 12 (S6: NO), in S10 the CPU 70 starts a flatbed reading process (referred to as FB reading process, hereinafter) to read a document that is placed by a user on the first platen glass 25.

Figure 16:
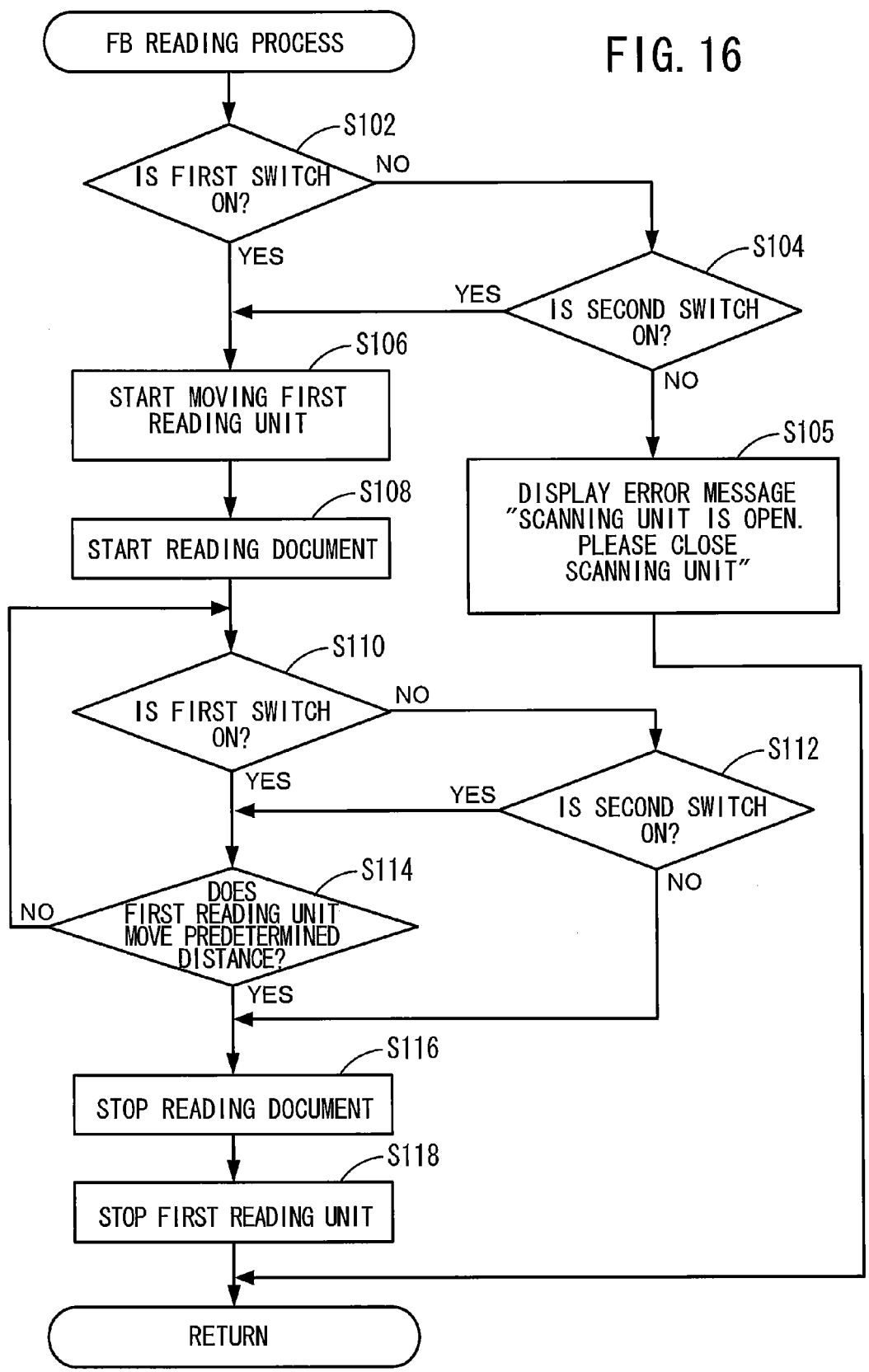
FIG. 16 is a flowchart illustrating an FB reading process.

FIG. 16 shows a flowchart of the FB reading process. In the FB reading process, in S102 the CPU 70 first determines whether the state of the first switch 51A is ON, and in S104 determines whether the state of the second switch 61A is ON. If the first switch 51A is OFF, and the second switch 61A OFF (S102: NO, S104: NO), the CPU 70 detects that the opening-and-closing state of the opening-and-closing section is the state D, that is, the scanning unit 3 is at the opening position. Because the scanning unit 3 is at the opening position, the CPU 70 cannot move the first reading unit 21 by using the second drive circuit 79, and judges that the CPU 70 cannot read the document. In this case, in S105 the CPU 70 displays, on the display section 9, an error message saying, "The reading unit is open. Please close the reading unit". The CPU 70 then ends the ADF reading process and the reading process without giving an instruction to move the first reading unit 21.

On the other hand, if the first switch 51A is ON (S102: YES), or if the first switch 51A is OFF and the second switch 61A is ON (S102: NO, S104: YES), the CPU 70 detects that the opening-and-closing state of the opening-and-closing section is the state A, B, or C, that is, that the scanning unit 3 is at the closing position. Because the scanning unit 3 is at the closing position, the CPU 70 judges that the CPU 70 can read a document placed on the first platen glass 25 by moving the first reading unit 21 in the sub-scanning direction.

In S106, the CPU 70 instructs the second drive circuit 79 to Move the first reading unit 21, thereby moving the first reading unit 21 in the sub-scanning direction. In S108, the CPU 70 instructs the first reading unit 21 to read the document, thereby starting reading a back surface of the document placed on the first platen glass 25.

In S110 the CPU 70 determines whether the state of the first switch 51A is ON, and in S112 determines whether the state of the second switch 61A is ON even after the process of reading the document is started. That is, during the process of reading the document, the CPU 70 repeatedly checks the state of the first switch 51A and the state of the second switch 61A. During the process of reading the document, if the first switch 51A is turned OFF, and the second switch 61A OFF (S110: NO, S112: NO), that is, if the opening-and-closing state of the opening-and-closing section is shifted to the state D, in S116 the CPU 70 instructs the first reading unit 21 to stop reading the document, thereby stopping reading the document. In S118, the CPU 70 instructs the second drive circuit 79 to stop moving the first reading unit 21, thereby stopping moving the first reading unit 21.

On the other hand, if the first switch 51A is ON (S110: YES) or if the first switch 51A is OFF and the second switch 61A is ON (S110: NO, S112: YES), i.e. if the opening-and-closing state of the opening-and-closing section remains in the state A, B, or C (or, the scanning unit 3 remains at the closing position), in S114 the CPU 70 waits until the first reading unit 21 moves a predetermined distance after the reading process is started. In this case, the predetermined distance indicates a distance equivalent to the document length of a document detected in the setting process S4.

If the first reading unit 21 has not moved the predetermined distance (S114: NO), the CPU 70 repeats the process of S110 and subsequent processes. If the first reading unit 21 has moved the predetermined distance (S114: YES), in S116 the CPU 70 stops reading the document, and in S118 stops moving the first reading unit 21. The CPU 70 then ends the FB reading process and the reading process.

5. Advantageous Effects of the Embodiment (1) In the multifunction peripheral 1 of the embodiment, there are a plurality of portions and members that move between the opening and closing positions. The opening-and-closing state of the scanning unit 3, the conveyance unit 4, and the cover member 5, which are among such portions and members, needs to be detected in order to appropriately convey the document, and convey the document along an appropriate conveying path 47, or to appropriately move the first reading unit 21.

In general, to detect the opening-and-closing state of the three sections, the scanning unit 3, the conveyance unit 4, and the cover member 5, three switches (or sensors) are used. However, in the case of the multifunction peripheral 1, for example, if the scanning unit 3 is opened, the document cannot be read regardless of the opening-and-closing state of the conveyance unit 4 and the cover member 5. Even when the scanning unit 3 is closed, if the conveyance unit 4 is opened, the document cannot be read by using the conveyance unit 4 to convey the document, regardless of the opening-and-closing state of the cover member 5. In this manner, in the multifunction peripheral 1 the switches provided in the conveyance unit 4 and the cover member 5 could be redundant, in terms of determining whether or not the document can be conveyed, or specifying a conveying path 47 along which the document can be conveyed.

In general, if switches increase in number, the number of lines connected to the switches increases, resulting in a rise in costs due to the increased numbers of switches and lines, reducing design flexibility, and making a complex control process that uses the state of switches. Therefore, it is desirable that the switches of the multifunction peripheral 1 are reduced.

The inventors of the present application examined the eight states that could be realized by the opening-and-closing states of the scanning unit 3, the conveyance unit 4, and the cover member 5, coming to the conclusion that, if the four states shown in FIG. 9 can be identified, the multifunction peripheral 1 can determine whether or not a document can be conveyed, and specify a conveying path 47 along which the document can be conveyed.

The inventors also found a way to detect the four states from combinations of the ON/OFF states of the two switches, and examined a structure to switch the states of the switches. As a result, as described above, the inventors came up with a way to switch the states of the switches by using the structure including the scanning unit 3, the conveyance unit 4, and the cover member 5, and to detect the four states from the combinations of the ON/OFF states of the two switches.

As a result, the multifunction peripheral 1 of the present embodiment can detect the opening-and-closing state of the scanning unit 3, the conveyance unit 4, the cover member 5 from the four states, i.e. the states A to D of the first switch 51A and the second switch 61A. Therefore, the multifunction peripheral 1 can determine whether or not the document can be conveyed and specify a conveying path 47 along which the document can be conveyed from the opening-and-closing state of the first switch 51A and the second switch 61A.

(2) In the multifunction peripheral 1 of the embodiment, on the document table 12, the document size detection sensor 17 is provided. Based on the detection result of the document size detection sensor 17, the multifunction peripheral 1 makes a determination as to whether or not to give an instruction to convey a document to a conveying path 47 (47A or 47B) along which the document can be conveyed.

In general, because of the size of documents, the multifunction peripheral 1 cannot convey a particular document by using a particular conveying path 47. Thus, a conveying path 47 used for conveyance may be determined based on a document. Meanwhile, the opening-and-closing state of the scanning unit 3, the conveyance unit 4, and the cover member 5 represents the state of the device, which is not associated with that of the document. Therefore, a conveying path 47 that is determined from the document may be different from a conveying path 47 that is determined from the opening-and-closing state and that can be used for the conveying the document.

When a conveying path 47 that can be used to convey a document is determined based on the opening-and-closing state of the scanning unit 3, the conveyance unit 4, and the cover member 5, the multifunction peripheral 1 of the embodiment makes a determination, based on the detection result of the document size detection sensor 17 that detects the document size of the document, as to whether or not to give an instruction to convey the document along the conveying path 47. Therefore, when a conveying path 47 determined from the opening-and-closing state is identical to a conveying path 47 determined from the document, the multifunction peripheral 1 can give an instruction to convey the document.

(3) If a conveying path 47 determined from the opening-and-closing state is different from a conveying path 47 determined from the document, the multifunction peripheral 1 does not give an instruction to convey the document. In the case described above or a case where the document cannot be conveyed, the multifunction peripheral 1 of the embodiment displays, on the display section 9, an error message describing the reason. Therefore, a user of the multifunction peripheral 1 can easily recognize, from what is displayed on the display section 9, the reason why a process of conveying the document is not started.

(4) The multifunction peripheral 1 of the embodiment detects the opening-and-closing state of the scanning unit 3, the conveyance unit 4, and the cover member 5 even after a process of conveying a document is started. When the opening-and-closing state has changed, the multifunction peripheral 1 stops conveying the document, and stops reading the document. Therefore, the multifunction peripheral 1 can reduce the possibility of being jammed as the document is not properly conveyed due to a change in the opening-and-closing state, and prevent an event in which the document cannot be read properly.

(5) If there is a change in the opening-and-closing state after the process of conveying the document is started, the multifunction peripheral 1 of the embodiment displays, on the display section 9, an error message describing the reason. Therefore, a user of the multifunction peripheral 1 can easily recognize, from what is displayed on the display section 9, the reason why the processes of conveying and reading the document is stopped after the process of conveying the document is started.

(6) The multifunction peripheral 1 of the embodiment can perform the ADF reading process and the FB reading process as process to read a document. The multifunction peripheral 1 determines which reading process to perform based on the state of the F sensor 18 that is detected when a reading instruction is input. If the multifunction peripheral 1 determines that the ADF reading process will be performed, the multifunction peripheral 1 then detects the opening-and-closing state of the scanning unit 3, the conveyance unit 4, and the cover member 5. Therefore, based on the opening-and-closing state that is detected immediately before the document is conveyed, the multifunction peripheral 1 can determine whether or not the document can be conveyed, and specify a conveying path 47 along which the document can be conveyed.

If the multifunction peripheral 1 determines that the FB reading process will be performed, the multifunction peripheral 1 uses the same states A to D that are used in the ADF reading process to make a determination as to whether or not the document can be read. Therefore, when making a determination as to whether or not the document can be read in the FB reading process, the multifunction peripheral 1 does not have to use (or prepare) a different sensor from the first switch 51A and the second switch 61A. Based on the opening-and-closing state of the first switch 51A and the second switch 61A, the multifunction peripheral 1 can determine whether or not the document can be read.

While the invention has been described in detail with reference to the embodiment thereof, it would be apparent to those skilled in the art that various changes and modifications may be made therein without departing from the scope of the invention.

(1) In the embodiment, the multifunction peripheral has scanner function. However, the multifunction peripheral may have printer function, copier function, or facsimile function.

(2) In the embodiment, the multifunction peripheral includes a single CPU 70 performing a plurality of processes including the reading process. However, the present invention is not limited thereto. For example, the multifunction peripheral 1 may include a plurality of CPUs, or only hardware circuit such as ASIC (Application Specific Integrated Circuit). Alternatively, the multifunction peripheral may include one or more CPU(s) and ASIC(s) or their combination. In other words, part of the processes implemented in hardware in the embodiment may be replaced with software processes, while conversely part of the processes implemented in software may be replaced with a hardware configuration.

(3) The programs executed by the CPU 70 may not be stored in the ROM 76, but stored in the CPU 70 itself or in other storage device.

(4) In the above embodiment, various error messages are displayed. However, not all the error messages may be displayed. Some of error messages may be appropriately selected and displayed.

(5) In the above embodiment, a concrete configuration where the state of the first switch 51A and the stated of the second switch 61A are switched is explained. However, the present invention is not limited to the configuration. The states A to D may be realized by a properly-modified configuration. That is, the states A-D specifying the opening-and-closing state of the scanning unit 3, the conveyance unit 4, and the cover member 5, may be identified by a configuration other than the states of the first switch 51A and the second switch 61A.

(6) In the above embodiment, the opening-and-closing state of the scanning unit 3, conveyance unit 4, and cover member 5 is detected even after a process of conveying a document is started. However, the present invention is not limited to the example. The present invention may only perform determining whether or not the document can be conveyed, and specifying a conveying path 47 along which the document can be conveyed from the opening-and-closing state of the scanning unit 3, the conveyance unit 4, and the cover member 5 before the process of conveying the document is started.

What is claimed is:

1. An image reading device comprising:
   a main unit;
   a scanning unit located above the main unit and configured to move relative to the main unit between a first base position and a first moved position, and scan an original sheet;
   a conveyance unit located above the scanning unit and comprising a tray and a cover member, and being formed with a first opening and a second opening, the conveyance unit configured to convey the original sheet along one of a first conveying path and a second conveying path, the first conveying path extending from the tray to the first opening, and the second conveying path extending from the tray to the second opening, the conveyance unit configured to move relative to the scanning unit between a second base position and a second moved position, the cover member configured to move between a third base position at which the cover member covers the second opening and a third moved position at which the cover member does not cover the second opening;
   a first detector configured to detect a first state and a second state, the first state including one of a case (a) where the scanning unit is at the first base position, the conveyance unit is at the second base position, and the cover member is at the third base position, and a case (b) where the scanning unit is at the first base position and the conveyance unit is at the second moved position, and the second state including one of a case (c) where the scanning unit is at the first base position, the conveyance unit is at the second base position, and the cover member is at the third moved position, and a case (d) where the scanning unit is at the first moved position; and
   a second detector configured to detect a third state in which the scanning unit is at the first base position, and the conveyance unit is at the second base position, and a fourth state including one of a case (e) where the scanning unit is at the first moved position, and a case (f) where the conveyance unit is at the second moved position, wherein the conveyance unit is configured to convey the original sheet along the first conveying path when the first detector detects the first state and the second detector detects the third state, and to convey the original sheet along the second conveying path when the first detector detects the second state and the second detector detects the third state.

2. The image reading device according to claim 1, further comprising:

a switching member configured to move between a position (a) and a position (b), the first conveying path being formed when the switching member is at the position (a) whereas the second conveying path being formed when the switching member is at the position (b); and a controller configured to:

determine whether the original sheet will be conveyed along the first conveying path or the second conveying path;

instruct the conveyance unit to convey the original sheet in a case (I) where the controller determines that the original sheet will be conveyed along the first conveying path and where the first detector detects the first state and the second detector detects the third state; and instruct the conveyance unit to convey the original sheet in a case (II) where the controller determine that the original sheet will be conveyed along the second conveying path and where the first detector detects the second state and the second detector detects the third state, wherein the controller does not instruct the conveyance unit to convey the original sheet in cases different from the case (I) and different from the case (II).

3. The image reading device according to claim 2, wherein the controller is further configured to:

detect whether a detection state of the first detector and the second detector is changed after the controller instructs the conveyance unit to convey the original sheet; and instruct the conveyance unit to stop conveying the original sheet and instruct the scanning unit to stop scanning the original sheet when the controller detects that the detection state is changed after the controller instructs the conveyance unit to convey the original sheet.

4. The image reading device, according to claim 3, further comprising a display unit, wherein the controller is further configured to:

display, on the display unit, a message indicating that the cover member is at the third base position when the controller detects that the detection state is changed to a state where the first detector detects the first state and the second detector detects the third state after the controller instructs the conveyance unit to convey the original sheet;

display, on the display unit, a message indicating that the cover member is at the third moved position when the controller detects that the detection state is changed to a state where the first detector detects the second state and the second detector detects the third state after the controller instructs the conveyance unit to convey the original sheet;

display, on the display unit, a message indicating that the conveyance unit is at the second moved position when the controller detects that the detection state is changed to a state where the first detector detects the first state and the second detector detects the fourth state after the controller instructs the conveyance unit to convey the original sheet; and display, on the display unit, a message indicating that the scanning unit is at the first moved position when the controller detects that the detection state is changed to a state where the first detector detects the second state and the second detector detects the fourth state after the controller instructs the conveyance unit to convey the original sheet.

5. The image reading device, according to claim 2, further comprising a display unit, wherein the controller is further configured to:

display, on the display unit, a message indicating that the cover member is at the third base position when the controller determines that the original sheet will be conveyed along the second conveying path, and when the first detector detects the first state and the second detector detects the third state;

display, on the display unit, a message indicating that the cover member is at the third moved position when the controller determines that the original sheet will be conveyed along the first conveying path, and when the first detector detects the second state and the second detector detects the third state;

display, on the display unit, a message indicating that the conveyance unit is at the second moved position when the first detector detects the first state and the second detector detects the fourth state; and display, on the display, a message indicating that the scanning unit is at the first moved position when the first detector detects the second state and the second detector detects the fourth state.

6. The image reading device according to claim 2, further comprising an original sheet size sensor configured to detect whether a width of the original sheet is larger than a width of the second opening, wherein the controller determines that the original sheet will be conveyed along the first conveying path when the width of the original sheet is larger than the width of the second opening, wherein the controller determines that the original sheet will be conveyed along the second conveying path when the width of the original sheet is smaller than or equal to the width of the second opening.

7. The image reading device according to claim 2, wherein the controller determines whether the original sheet will be conveyed along the first conveying path or the second conveying path based on a sheet type of the original sheet.

8. The image reading device according to claim 2, further comprising an original sheet sensor configured to detect an existence of the original sheet on the tray, wherein when the controller detects the existence of the original sheet on the tray, the controller instructs the conveyance unit to convey the original sheet.

9. The image reading device according to claim 8, wherein the scanning unit includes a scanning member configured to move in a first direction to read the original sheet, wherein the controller performs a reading process in which the original sheet is read by the scanning member while the scanning member moves in the first direction when the original sheet sensor does not detect the existence of the original sheet and the first detector detects the first state, or when the original sheet sensor does not detect the existence of the original sheet, the first detector detects the second state, and the second detector detects the third state.

10. The image reading device according to claim 1, wherein the first detector includes:
- a first pressing member located in the conveyance unit and configured to move in response to a movement of the cover member;
- a first moving member located in the scanning unit and configured to move between a first position and a second position; and
- a first sensor located in the main unit,
- wherein the first pressing member presses the first moving member when the conveyance unit is at the second base position and the cover member is at the third moved position whereas the first pressing member does not press the first moving member when the conveyance unit is at the second moved position or when the cover member is at the third base position,
- wherein the first moving member is at the second position when the first moving member is pressed by the first pressing member whereas the first moving member is at the first position when the first moving member is not pressed by the first pressing member,
- wherein the first sensor detects the first state when the scanning unit is at the first base position and when the first moving member is at the first position whereas the first sensor detects the second state when the scanning unit is at the first base position and when the first moving member is at the second position.

11. The image reading device according to claim 1, wherein the second detector includes:
- a second pressing member located in the conveyance unit;
- a second moving member located in the scanning unit and configured to move between a third position and a fourth position; and
- a second sensor located in the main unit,
- wherein the second pressing member presses the second moving member when the conveyance unit is at the second base position whereas the second pressing member does not press the second moving member when the conveyance unit is at the second moved position,
- wherein the second moving member is at the third position when the second moving member is pressed by the second pressing member whereas the second moving member is at the fourth position when the second moving member is not pressed by the second pressing member,
- wherein the second sensor detects the third state when the scanning unit is at the first base position and when the second moving member is at the third position whereas the second sensor detects the fourth state when the scanning unit is at the first base position and when the second moving member is at the fourth position.

* * * * *